US012485312B2

(12) United States Patent
Aibara et al.

(10) Patent No.: US 12,485,312 B2
(45) Date of Patent: Dec. 2, 2025

(54) INFORMATION PROCESSING DEVICE, INFORMATION PROCESSING METHOD, AND NON-TRANSITORY RECORDING MEDIUM

(71) Applicants: CASIO COMPUTER CO., LTD., Tokyo (JP); ASICS CORPORATION, Kobe (JP)

(72) Inventors: Takehiro Aibara, Hamura (JP); Nao Hirakawa, Kobe (JP); Hiroto Mori, Kobe (JP); Yasuhiro Nomura, Kobe (JP)

(73) Assignees: CASIO COMPUTER CO., LTD., Tokyo (JP); ASICS CORPORATION, Hyogo (JP)

( * ) Notice: Subject to any disclaimer, the term of this patent is extended or adjusted under 35 U.S.C. 154(b) by 836 days.

(21) Appl. No.: 17/829,631

(22) Filed: Jun. 1, 2022

(65) Prior Publication Data
US 2022/0395727 A1    Dec. 15, 2022

(30) Foreign Application Priority Data

Jun. 10, 2021 (JP) ................................ 2021-097584

(51) Int. Cl.
*A63B 24/00* (2006.01)
*G06N 7/00* (2023.01)
(52) U.S. Cl.
CPC ...... *A63B 24/0062* (2013.01); *A63B 24/0003* (2013.01); *G06N 7/00* (2013.01)
(58) Field of Classification Search
CPC ............ A63B 24/0062; A63B 71/0062; A63B 2024/0068; A63B 2220/12
See application file for complete search history.

(56) References Cited

U.S. PATENT DOCUMENTS 10,504,381 B2   12/2019  Sato et al.
2022/0379166 A1*  12/2022  Lee ..................... A63B 24/0062

FOREIGN PATENT DOCUMENTS

JP    2016034479 A    3/2016
JP    2018007979 A    1/2018

OTHER PUBLICATIONS

Japanese Office Action dated Jul. 5, 2022 (and English translation thereof) issued in counterpart JP Application No. 2021-097584.

* cited by examiner

*Primary Examiner* — Robert J Utama
(74) *Attorney, Agent, or Firm* — Holtz, Holtz & Volek PC

(57) ABSTRACT

In an information processing device, at least one processor is configured to derive, based on a first model generated with as an input a first indicator expressing first exercise information of a subject acquired in a first period, and as an output a second indicator expressing second exercise information, first estimation data expressing the second indicator relative to first indicator specified in the first period, the second exercise information being different than the first exercise information of the subject, the second indicator having correlation with the first indicator; derive, based on a second model generated with as an input the first indicator acquired in the second period, and as an output the second indicator, second estimation data expressing the second indicator relative to the first indicator specified in the second period; and present the first estimation data and the second estimation data in a mutually comparable manner on a presenter.

11 Claims, 14 Drawing Sheets

SPEED, PITCH OF DAY 1

SPEED, STRIDE OF DAY 1

SPEED, PITCH OF DAY 2

SPEED, STRIDE OF DAY 2

DEPENDENCY ON SPEED OF PITCH

DEPENDENCY ON SPEED OF STRIDE

DEPENDENCY ON SPEED OF PITCH

INFORMATION PROCESSING DEVICE, INFORMATION PROCESSING METHOD, AND NON-TRANSITORY RECORDING MEDIUM

CROSS-REFERENCE TO RELATED APPLICATION

This application claims the benefit of Japanese Patent Application No. 2021-097584, filed on Jun. 10, 2021, the entire disclosure of which is incorporated by reference herein.

FIELD

The present disclosure relates generally to an information processing device, an information processing method, and a non-transitory recording medium.

BACKGROUND

In the related art, a device for evaluating a running form of a subject has been described (for example, Unexamined Japanese Patent Application Publication No. 2016-34479). In this evaluation device, body motion information of a human subject is applied to an arithmetic expression to calculate a score of the running form of the human subject. The arithmetic expression expresses a correlation between the body motion information extracted from information about the running of a plurality of test runners and an evaluation applied, by an expert, to the running of each of the plurality of test runners.

SUMMARY

An information processing device according to an aspect of the present disclosure includes at least one processor configured to:
derive, based on a first model generated with as an input a first indicator expressing first exercise information of a certain subject acquired in a first period, and as an output a second indicator expressing second exercise information acquired in the first period, first estimation data expressing the second indicator in the first period, for a case in which the first indicator is assumed to be a certain value in the first period, the second exercise information being different than the first exercise information of the subject, the second indicator having correlation with the first indicator;
derive, based on a second model generated with as an input the first indicator acquired in a second period different than the first period, and as an output the second indicator acquired in the second period, second estimation data expressing the second indicator in the second period, for a case in which the first indicator is assumed to be the certain value in the second period; and
present the derived first estimation data in the first period and the derived second estimation data in the second period on a presenter in a mutually comparable manner.

BRIEF DESCRIPTION OF THE DRAWINGS

A more complete understanding of this application can be obtained when the following detailed description is considered in conjunction with the following drawings, in which.

DETAILED DESCRIPTION

Embodiment 1

Figure 1:
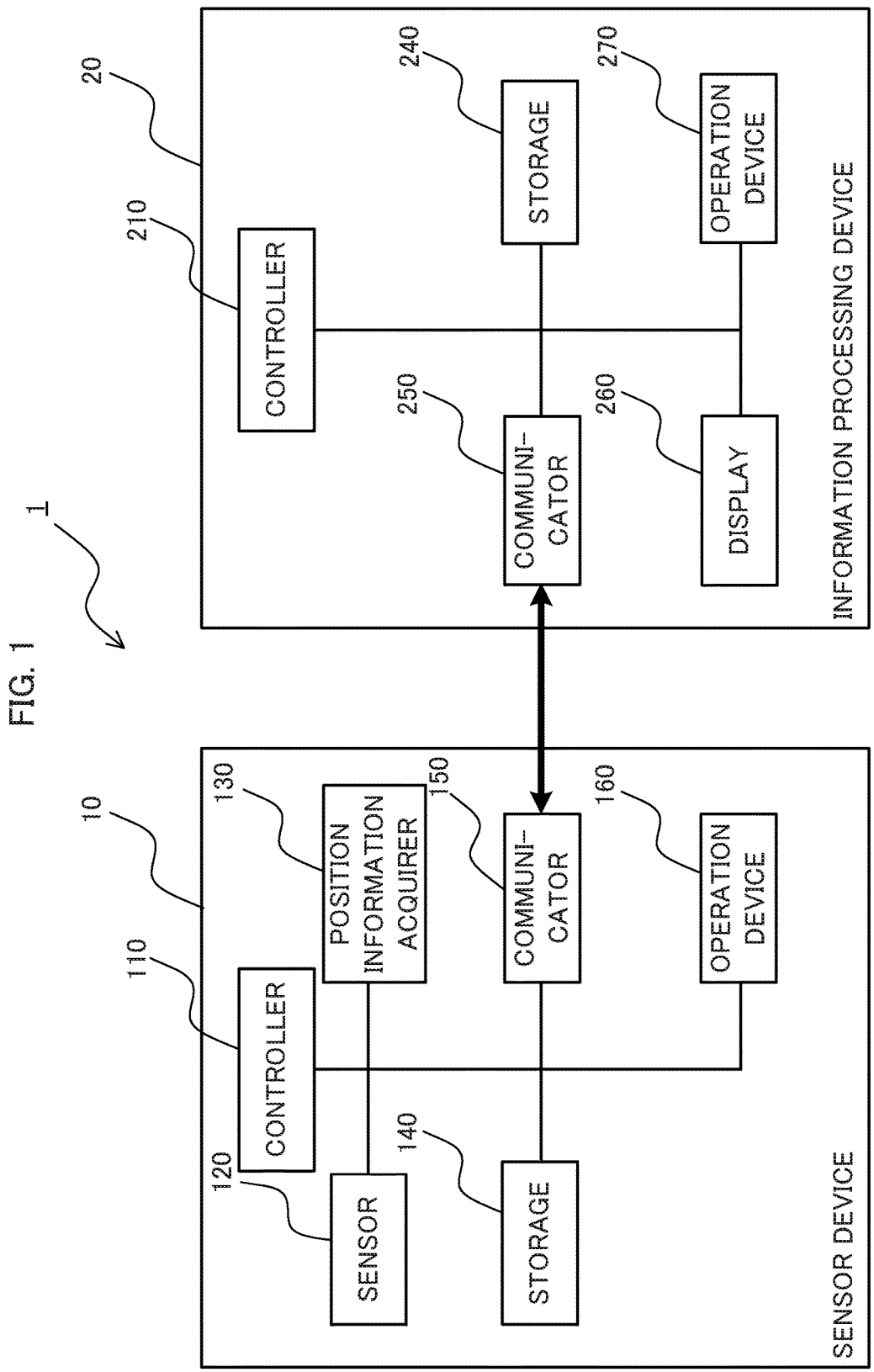
FIG. 1 is a block diagram illustrating the configuration of an information processing system according to Embodiment 1.

Hereinafter, embodiments of the present disclosure are described in detail while referencing the drawings. Note that, in the drawings, identical or corresponding components are denoted with the same reference numerals. An information processing system 1 according to the Embodiment 1 is a system that presents data expressing changes over time in an exercise state of an organism to be measured (a subject). In Embodiment 1, a case is described of moving exercise, such as running or the like, of a person.

As illustrated in FIG. 1, the information processing system 1 includes a sensor device 10 that generates and outputs exercise data including indicators expressing exercise information of a subject; and an information processing device 20 that generates, on the basis of the exercise data output by the sensor device 10, a model having one indicator as an input and another indicator as an output, and that uses that model to derive and present estimation data of the indicators.

The sensor device 10 is a device that is worn on the body of the subject. In one example, the sensor device 10 is a small wearable device worn near the waist, along the trunk of the subject. As illustrated in FIG. 1, the sensor device 10 includes a controller 110, a sensor 120, a position information acquirer 130, a storage 140, a communicator 150, and an operation device 160.

In one example, the controller 110 includes an arithmetic processing device such as a central processing unit CPU), and a random access memory (RAM). The controller 110 executes a program stored in the storage 140 to execute processing for acquiring outputs of the sensor 120 and the position information acquirer 130 at a predetermined timing, and calculating, on the basis of these outputs, a plurality of indicators that all express the exercise information.

The sensor 120 is implemented as a desired motion sensor that detects motion of the sensor device 10 and, in one example, detects acceleration occurring in a straight line direction along three mutually orthogonal axes, angular velocity occurring in a rotational direction having three mutually orthogonal axes as an axis, or geomagnetism. In the present embodiment, a case is described in which the sensor 120 is a three-axis acceleration sensor that detects various components (ax, ay, az) of an acceleration vector in straight line directions along an x-axis, a y-axis, and a z-axis that are mutually orthogonal.

A measurement axis of the sensor 120 is fixed with respect to the subject. For example, with the sensor 120, an axis extending in the up-down direction is defined as the x-axis, and the acceleration component facing downward (direction toward ground surface) is defined as the + direction. In this case, the x-axis substantially matches an extending direction of a body axis of the subject. Additionally, an axis extending in the left-right direction with respect to the subject is defined as the y-axis, and the acceleration component in the leftward direction is defined as the + direction. Additionally, an axis extending in the front-back direction with respect to the subject is defined as the z-axis, and the acceleration component in the frontward direction (advancing direction) is defined as the + direction. In an example in which the measurement axis is fixed with respect to the subject, the sensor 120 can acquire acceleration data of the subject in three directions, namely the up-down direction (the x-axis direction), the left-right direction (the y-axis direction), and the front-back direction (the z-axis direction). The acceleration data acquired by the sensor 120 is associated with time data generated by the controller 110, and stored in storage 140.

The position information acquirer 130 has a function for acquiring a current position of the sensor device 10 and, in one example, includes a global positioning system (GPS) device. In the present embodiment, a case is described in which the position information acquirer 130 is implemented as a GPS device. The position information acquirer 130 includes a receiver that receives signals from a plurality of GPS satellites, and acquires, on the basis of the received signals, the current position of the subject to which the position information acquirer 130 is fixed. The position information data acquired by the position information acquirer 130 is associated with the time data generated by the controller 110, and stored in storage 140.

Examples of the plurality of indicators, calculated by the controller 110 on the basis of the outputs of the sensor 120 and the position information acquirer 130, include a speed, a pitch, a stride, a stride-height ratio, an up-down motion, an up-down motion-height ratio, a left-right motion, a front-back motion, a ground contact time, a leg swing time, a ground contact time rate, a leg swing time rate, an amount of deceleration, an amount of sinking, a sinking amount-height ratio, a sinking time, a braking time, a propelling time, a ground contact impact, a kick-off acceleration, a kick-off time, an amount of pelvic rotation, a stiffness, a stiffness-weight ratio, a ground contact angle, a kick-off angle, a total impulse, a propulsion impulse, a deceleration impulse, an up-down impulse, a left-right impulse, a left-right direction impact, an amount of backward trunk tilt, an amount of pelvic depression, an amount of pelvic lifting, a pelvic rotation timing after ground contact, a forward tilt, an impact peak tilt, and the like of the subject in a case where the subject is walking or running.

Any known method may be used as the method whereby the controller 110 calculates the various indicators on the basis of the outputs of the sensor 120 and the position information acquirer 130. For example, the known method described in Japanese Patent No. 6648439, Japanese Patent No. 6711433, Japanese Patent No. 5849092, or the like can be used.

For example, the controller 110 can calculate the speed from time changes of the position data output by the position information acquirer 130. Additionally, the controller 110 can obtain a running cycle, which is the period of a waveform of the up-down direction component ax of the acceleration vector expressed by the sensor data output by the sensor 120, and calculate the pitch, which is a number of steps per unit time, from the running cycle. The stride is a step width per step, and the controller 110 can calculate the stride by dividing the speed per one minute by the pitch. The controller 110 can calculate the stride-height ratio by dividing the stride by the height of the subject.

The up-down motion is the difference between a highest point and a lowest point of a position from when one foot makes ground contact to when the other foot makes ground contact. The controller 110 can calculate the position of the highest point and the lowest point by integrating the up-down direction component ax of the acceleration vector expressed by the sensor data output by the sensor 120, and can calculate the up-down motion, which is the difference between the position of the highest point and the lowest point. The controller 110 can calculate the up-down motion-height ratio by dividing the up-down motion by the height of the subject. In the present specification, the "position" is the attachment position of the sensor device 10 on the subject and, in one example, is a position of the waist to which the sensor device 10 is attached.

The left-right motion is a left-right fluctuation width of the position from when one foot makes ground contact to when the other foot makes ground contact. The controller 110 can calculate the position of a leftmost point and a rightmost point by integrating the left-right direction component ay of the acceleration vector expressed by the sensor data output by the sensor 120, and can calculate the left-right motion, which is the difference between the position of the leftmost point and the rightmost point. The front-back motion is a fluctuation width in the front-back direction of the position from when one foot makes ground contact to when the other foot makes ground contact. The controller 110 can calculate the front-back motion by integrating the front-back direction component az of the acceleration vector expressed by the sensor data output by the sensor 120, and subtracting a distance traveled at an average speed.

The ground contact time is an amount of time from when one foot makes ground contact to when the other foot makes ground contact, and the leg swing time is an amount of time from when one foot leaves the ground to when the one foot contacts the ground. The controller 110 can calculate the ground contact time and the leg swing time by identifying timings of ground contact and ground leaving on the basis of the up-down direction component ax of the acceleration vector expressed by the sensor data output by the sensor 120. The controller 110 can calculate the ground contact time rate by ground contact time/(ground contact time+leg swing time), and can calculate the leg swing time rate by leg swing time/(ground contact time+leg swing time).

The amount of deceleration is an amount of decrease of the speed in the front-back direction in an interval in which one foot is making ground contact (interval from when one foot makes ground contact to when the one foot leaves the ground; hereinafter referred to as "ground contact interval"). The controller 110 can calculate the amount of deceleration by integrating, for the ground contact interval, the retreating direction component ay of the acceleration vector expressed by the sensor data output by the sensor 120.

The amount of sinking is the difference between the position when one foot makes ground contact and the position at the lowest point thereafter (position when the waist is at the lowest position). The controller 110 can calculate the amount of sinking by integrating the up-down direction component ax of the acceleration vector expressed by the sensor data output by the sensor 120, for from when ground contact is made to a timing at which the position is positioned at the lowest point. The controller 110 can calculate the sinking amount-height ratio by dividing the amount of sinking by the height of the subject. The controller 110 can obtain, as the amount of sinking time, an amount of time from when one foot makes ground contact to the timing at which the position is positioned at the lowest point.

The braking time is an amount of time from when ground contact is made to when the front-back direction component az of the acceleration vector changes to the propelling direction. The controller 110 can calculate the braking time by identifying the timing of ground contact and the timing at which the front-back direction component az, of the acceleration vector expressed by the sensor data output by the sensor 120, changes to the propelling direction. Additionally, the controller 110 can obtain, as the propelling time, an amount of time from the timing at which the front-back direction component az of the acceleration vector changes to the propelling direction to when leaving the ground.

The ground contact impact is an amount of impact caused when ground contact is made, and is also called an "impact peak amount." The controller 110 can calculate, as the ground contact impact, a maximum value of a magnitude (norm) of acceleration on the basis of the various components, immediately after ground contact is made, of the acceleration vector expressed by the sensor data output by the sensor 120. A magnitude A of the acceleration is expressed by Equation (1) below.

Equation 1

$$A = \sqrt{a_x^2 + a_y^2 + a_z^2} \quad (1)$$

The kick-off acceleration is the magnitude of acceleration when propelling, and the controller 110 can obtain the kick-off acceleration from the magnitude of the front-back direction component az of the acceleration vector expressed by the sensor data output by the sensor 120. The kick-off time is an amount of time that acceleration in the propelling direction occurs during the ground contact period. The controller 110 can obtain the kick-off time by measuring the amount of time that the front-back direction component az, of the acceleration vector expressed by the sensor data output by the sensor 120, occurs. Alternatively, the controller 110 may obtain the kick-off time by measuring, on the basis of the up-down direction component ax of the acceleration vector expressed by the sensor data, the amount of time from the timing at which the position is at the lowest point to when one foot leaves the ground.

The amount of pelvic rotation is an amount that the waist rotates in an interval from when one foot makes ground contact and leaves the ground to when the one foot makes ground contact again (hereinafter referred to as "two-step cycle interval"), or in an interval from when one foot makes ground contact to when the other foot next makes ground contact (hereinafter referred to as "one-step cycle interval"). The controller 110 can obtain the amount of pelvic rotation in the two-step cycle interval or the one-step cycle interval on the basis of a rotation speed expressed by the left-right direction component ay and the front-back direction component az of the acceleration vector expressed by the sensor data output by the sensor 120. The stiffness is a spring constant in a case in which the foot is considered to be a spring, and the controller 110 can obtain the stiffness on the basis of a change in the up-down direction component ax of the acceleration vector expressed by the sensor data output by the sensor 120. Additionally, the controller 110 can calculate the stiffness-weight ratio by dividing the stiffness by the weight of the subject.

The ground contact angle is an angle between a speed vector of when one foot makes ground contact and a horizontal plane or a ground surface, and the kick-off angle is an angle between the speed vector of when leaving the ground and the horizontal plane or the ground surface. The controller 110 can calculate the ground contact angle and the kick-off angle on the basis of the various components along the three axes of the acceleration sensor expressed by the sensor data output by the sensor 120.

The total impulse, the propulsion impulse, the deceleration impulse, the up-down impulse, and the left-right impulse are overall impulses or impulses in each direction. The controller 110 can calculate the various impulses on the basis of the various components of the acceleration vector, in each direction along the three axes of the acceleration sensor, expressed by the sensor data output by the sensor 120.

More specifically, as illustrated in Equation (2) below, the controller 110 can calculate the total impulse I by integrating, for the two-step cycle interval, the magnitude of the vector sum of the components (ax, ay, az) of the various directions of the acceleration vector.

Equation 2

$$I = \int \sqrt{a_x^2 + a_y^2 + a_z^2} \, dt \quad (2)$$

Likewise, the controller 110 can calculate the propulsion impulse by integrating the front-back direction component az for an interval from the timing at which the front-back direction component az of the acceleration vector changes to the propelling direction to when leaving the ground. Additionally, the controller 110 can calculate the deceleration impulse by integrating the front-back direction component az for an interval from when ground contact is made to the timing at which the front-back direction component az changes to the propelling direction. Moreover, the controller 110 can calculate the up-down impulse by integrating the up-down direction component ax of the acceleration vector for the one-step cycle interval, and can calculate the left-right impulse by integrating the left-right direction component ay for the one-step cycle interval.

The left-right direction impact is an amount of impact in the left-right direction received by the subject in the two-step cycle interval. The controller 110 can calculate, as the left-right direction impact and on the basis of the sensor data output by the sensor 120, a maximum amount of change of the left-right direction component ay of the acceleration vector in the two-step cycle interval. The amount of backward trunk tilt is a maximum value of an angle of a backward tilt direction of the waist after ground contact is made. The controller 110 can calculate the amount of backward trunk tilt on the basis of the components of the various directions of the acceleration vector expressed by the sensor data output by the sensor 120.

The amount of pelvic depression is an amount of tilting that occurs due to the being unable to completely support the pelvis horizontally with respect to the ground contact impact. The controller 110 can calculate the amount of pelvic depression from an amount of change between the angle when ground contact is made and a standing leg-side maximum raise angle, on the basis of the components of the various directions of the acceleration vector expressed by the sensor data output by the sensor 120. In a case where the pelvis is viewed from the front, the amount of pelvic lifting is an angle expressing how much the pelvis rotates at maximum from the moment of ground contact of a foot. The controller 110 can calculate the amount of pelvic lifting from an amount of change between the angle when ground contact is made and the swing leg-side maximum raise angle, on the basis of the components of the various directions of the acceleration vector expressed by the sensor data output by the sensor 120, in an interval from the time of standing leg-side maximum raising to the next ground contact.

The pelvic rotation timing after ground contact expresses, as a ratio, when, as a characteristic of the motion of the pelvic rotation, a motion, such as the pelvis being swung forward on the ground contact leg-side, is occurring. The controller 110 can calculate, as the pelvic rotation timing after ground contact, a ratio (%) obtained by searching before and after a ground contact in a time width half the amount of time from the ground contact to the next ground contact, and dividing the amount of time from when the pelvis rotates most to the ground contact by the amount of time from the ground contact to the next ground contact.

The forward tilt expresses a tilt angle in the advancing direction, relative to the vertical direction of the sensor device 10. The controller 110 can calculate, as the amount of forward tilt, a value on the basis of the up-down direction component ax and the front-back direction component az of the acceleration vector expressed by the sensor data output by the sensor 120. Here, the value is obtained by averaging, in the two-step cycle interval, the tilt angle in the advancing direction relative to the vertical direction, Additionally, the controller 110 can calculate the forward tilt at a specific timing such as the ground contact timing of one foot, the ground leaving timing of the one foot, the timing at which the position is at the lowest point, or the like.

The impact peak tilt expresses the load on the foot when ground contact is made. The controller 110 can calculate the impact peak tilt by dividing the ground contact impact described above by an amount of time from when ground contact is made to when the ground contact impact is greatest. Alternatively, the controller 110 may use an inverse trigonometric function (for example, an arc tangent) to convert a value, obtained by dividing the ground contact impact by the amount of time from when ground contact is made to when the ground contact impact is greatest, to a parameter of an angle, and calculate the converted parameter of the angle as the impact peak tilt.

The storage 140 is implemented as a large capacity storage device, and stores the indicators that express the exercise information and are calculated by the controller 110. The communicator 150 has a function for exchanging data with the information processing device 20 using wireless communication such as a wireless local area network (LAN), short-range wireless communication (for example, Bluetooth (registered trademark) Low Energy (BLE)), or the like, or wired communication such as a universal serial bus (USB), or the like, and sends, to the information processing device 20, the exercise data in the form of the indicators stored in the storage 140. Any known method may be used as the communication method. The communicator 150 may send the exercise data stored in the storage 140 at once after the sensor device 10 has completed the measurements. Alternatively, the communicator 150 may send the exercise data stored in the storage 140 at predetermined timings while the sensor 120 is performing the measurements.

The operation device 160 receives an operation from an operator and outputs the received operation to the controller 110. The operation device 160 may, for example, include an input button or a touch panel.

Figure 2:
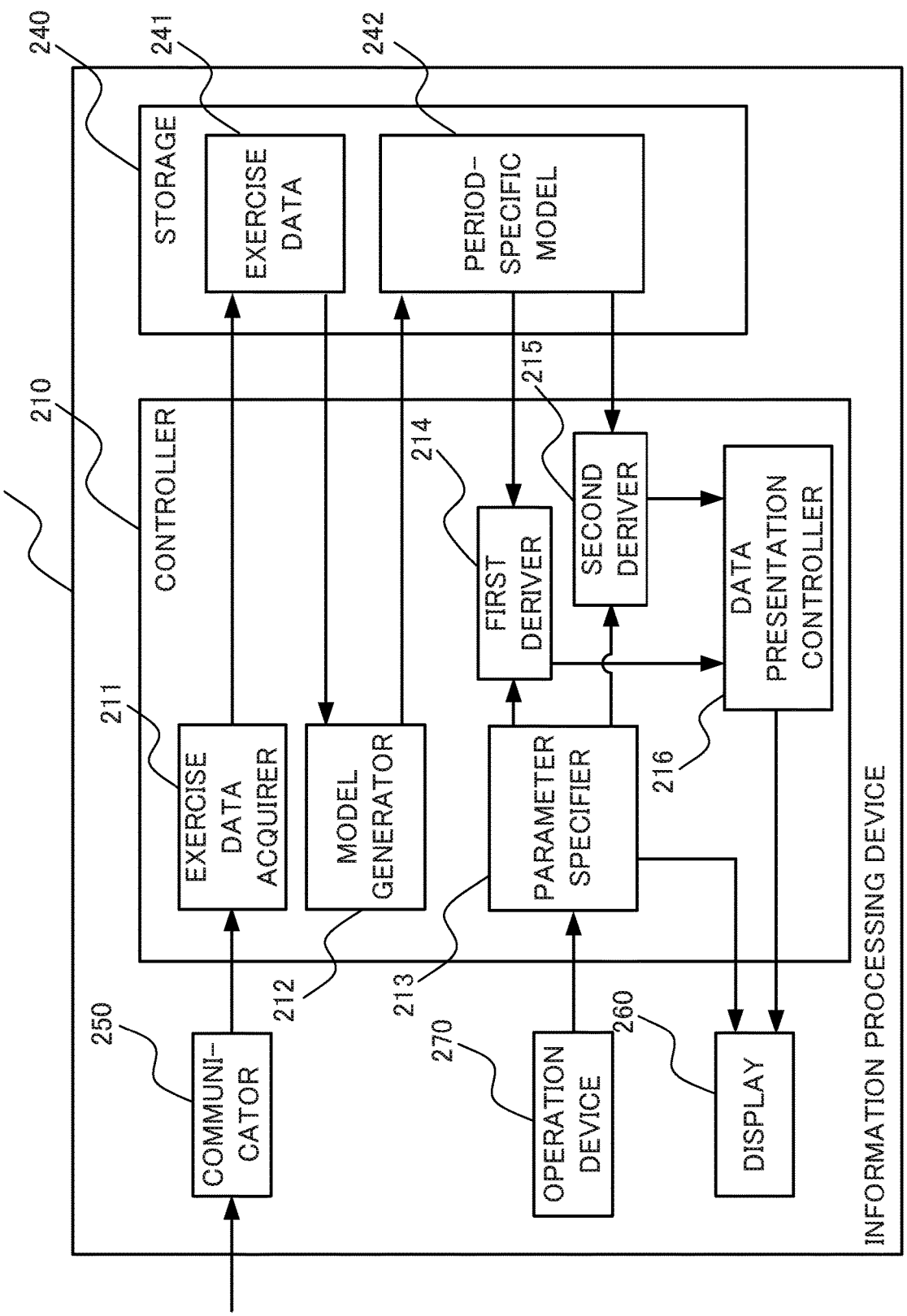
FIG. 2 is a block diagram illustrating the functional configuration of an information processing device according Embodiment 1.

As illustrated in FIGS. 1 and 2, the information processing device 20 includes a controller 210, a storage 240, a communicator 250, a display 260, and an operation device 270 The information processing device 20 may be any information terminal such as, for example, a smartphone. FIG. 1 illustrates the hardware configuration of the information processing device 20, and FIG. 2 illustrates the functional configuration of the information processing device 20.

In one example, the controller 210 includes at least one arithmetic processing device such as a CPU as a processor, and a RAM. The controller 210 executes a program stored in the storage 240 to function as an exercise data acquirer 211, a model generator 212, a parameter specifier 213, a first deriver 214, a second deriver 215, and a data presentation controller 216, as illustrated in FIG. 2. In a case where the information processing device 20 is a smartphone, a pre-installed application is executed and, as a result, the controller 210 functions as the various functional components illustrated in FIG. 2.

The storage 240 is implemented as a large-capacity storage device that serves as a non-transitory recording medium, and stores exercise data 241 acquired by the exercise data acquirer 211 of the controller 210 and a period-specific model 242 generated by the model generator 212 of the controller 210. The communicator 250 has a function for communicating with the sensor device 10 using wireless communication such as a wireless LAN, short-range wireless communication (for example, BLE), or the like, or wired communication such as a USB, or the like. The communicator 250 receives the exercise data sent by the communicator 150 of the sensor device 10.

The display 260 displays an operation screen or presents a variety of data including estimation data of the indicators generated by the controller 210. The display 260 is constituted from any information display device and, in one example, includes a liquid crystal display (LCD). The operation device 270 receives an operation that the operator performs on the operation screen, and outputs the received operation to the controller 210. The display 260 and the operation device 270 may be integrated and, may for example, be constituted from a touch screen.

The exercise data acquirer 211 of the controller 210 mutually associates various exercise data obtained in the same distance from among the exercise data that the communicator 250 receives from the communicator 150 of the sensor device 10 to acquire the exercise data 241, and stores the acquired exercise data 241 in the storage 240. As described above, the received exercise data are indicators that express the exercise information of the subject and are calculated by the controller 110 on the basis of the outputs of the sensor 120 and the position information acquirer 130 of the sensor device 10. Examples of the indicators expressing the exercise information include the speed, the pitch, the stride, the stride-height ratio, the up-down motion, the up-down motion-height ratio, the left-right motion, the front-back motion, the ground contact time, the leg swing time, the ground contact time rate, the leg swing time rate, the amount of deceleration, the amount of sinking, the sinking amount-height ratio, the sinking time, the braking time, the propelling time, the ground contact impact, the kick-off acceleration, the kick-off time, the amount of pelvic rotation, the stiffness, the stiffness-weight ratio, the ground contact angle, the kick-off angle, the total impulse, the propulsion impulse, the deceleration impulse, the up-down impulse, the left-right impulse, the left-right direction impact, the amount of backward trunk tilt, the amount of pelvic depression, the amount of pelvic lifting, the pelvic rotation timing after ground contact, the forward tilt, the impact peak tilt, and the like.

The model generator 212 of the controller 210 generates, as described later and on the basis of the exercise data 241 stored in the storage 240, the period-specific model 242 that is a model for each predetermined period, and stores the generated period-specific model 242 in the storage 240. The period-specific model 242 is a model in which a first indicator from among the plurality of indicators in any period is an input, and a second indicator from among the plurality of indicators in the period is an output. The period-specific model 242 generated for a first period is referred to as a first model, and the period-specific model 242 generated for a second period is referred to as a second model. Here, the first indicator and the second indicator have correlation with each other and are selected as desired from the exercise data 241.

Here, the periods for which the model generator 212 generates the period-specific model 242 may be periods for which the date and times are mutually different for a case in which the subject exercises under the same conditions (condition related to a fatigue state of the subject, condition related to worn items of the subject, condition related to weather at the time of running of the subject (these conditions are described later), and the course that the subject runs) except for the date and time and, in such a case, may be periods for which only the date and times are mutually different. Alternatively, the periods may be periods for which the date and times are mutually different, regardless of the conditions other than the date and time. Alternatively, the periods may be periods in which the subject performs exercise under a specific condition for a case in which the subject exercises under diverse conditions. Examples of the diverse conditions corresponding to the various periods include conditions related to the fatigue state when the subject exercises, the worn items when the subject exercises, the weather when the subject exercises, the elevation of the location where the subject exercises, a road surface condition of the course where the subject exercises (runs), or a road surface incline of the course where the subject exercises (runs). Note that the periods may have any length, and may be one day or a plurality of days. The lengths of the various periods may be mutually different.

In a case where a condition of whether the subject is in a fatigued state or in a non-fatigued state is set, the fatigue state may be determined by a value of a specific indicator related to exercise or biometric information. For example, since the ground contact time in a case of running is dependent on the fatigue state, whether the subject is in the fatigued state or in the non-fatigued state may be determined on the basis of whether the ground contact time exceeds a predetermined threshold. Additionally, the running distance or pace to that point in time, or the heart rate also affects the fatigue state and, as such, these indicators may be used to determine whether the subject is in the fatigued state or in the non-fatigued state.

The condition related to the worn items worn by the subject is, for example, the presence/absence or type of shoes, apparel, or a wearable bag such as a waist pouch or a backpack. The condition related to the weather is, for example, a condition related to temperature, humidity, barometric pressure, wind direction, wind speed, or rainfall. More specifically, conditions related to the parameters of the temperature, the humidity, and the rainfall are conditions based on which of a plurality of mutually different predetermined corresponding threshold ranges (for example, respectively, a low-temperature range, a mid-temperature range, and a high-temperature range, a low-humidity range, a mid-humidity range, and a high-humidity range, and a low-rainfall range (including values of 0), a mid-rainfall range, and a high-rainfall range) each parameter is in. Additionally, the conditions related to wind direction and wind speed respectively are a condition based on which of a head wind or a tail wind the wind direction is with respect to the subject, and a condition based on which of a plurality of mutually different predetermined threshold ranges (for example, a low-speed range, a mid-speed range, and a high-speed range) the wind speed is in. The condition related to elevation is a condition expressed by the elevation or the barometric pressure of the location where the subject exercises, and is a condition based on which of a plurality of mutually different predetermined threshold ranges (for example, respectively, a low-elevation region, a mid-elevation range, and a high-elevation range, and a low-barometric pressure range, a mid-barometric pressure range, and a high-barometric pressure range) the elevation or barometric pressure is in. The condition related to the road surface condition is a condition of which state, for example, asphalt, dirt, grass, wet, or dry, the road surface is in. The condition related to the road surface incline is a condition of, for example, the road surface being uphill or downhill, or that the incline angle of the road surface is within a predetermined threshold range.

In a case of acquiring exercise data of various periods under different conditions, the exercise data acquirer 211 may acquire sensor data for determining the conditions. For example, in cases in which the condition related to weather of the various periods differs, the sensor 120 of the sensor device 10 may include a temperature sensor, a humidity sensor, a direction sensor, a barometric pressure sensor, or an anemometer, and the exercise data acquirer 211 may classify the conditions on the basis of these pieces of sensor data to acquire the exercise data. Alternatively, the exercise data acquirer 211 may determine the conditions by acquiring, on the basis of the position information data, weather information, elevation information, and information about the road surface condition or the road surface incline from an external server. Alternatively, the exercise data acquirer 211 may determine the conditions on the basis of inputs by the subject or the operator.

FIG. 3 illustrates an example of the indicators expressing the exercise information of day 1 and day 2 for a case in which the conditions are the same. Here, the phrase "a case in which the conditions are the same" includes cases in which at least any one condition of the conditions related to the fatigue state, the worn items, the weather, the elevation, the road surface condition, or the road surface incline is the same. FIG. 3A is a graph illustrating the speed and the pitch for a distance of day 1, FIG. 3B is a graph illustrating the speed and the pitch for a distance of day 2, FIG. 3C is a graph illustrating the speed and the stride for the distance of day 1, and FIG. 3D is a graph illustrating the speed and the stride for the distance of day 2. Here, the pitch is the number of steps per one minute, and the stride is the step width.

Figure 3A:
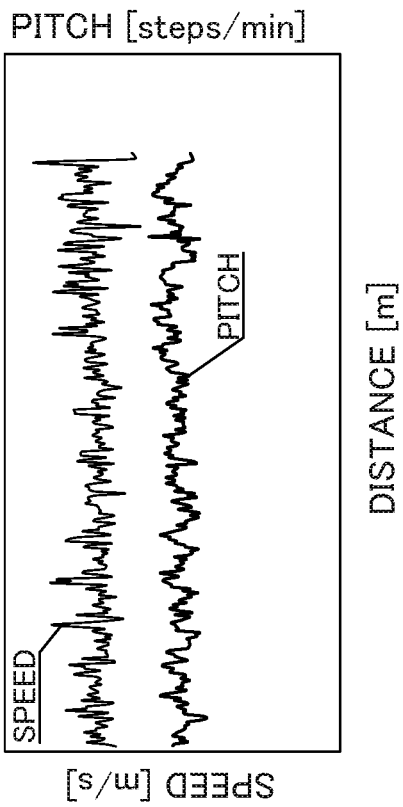
FIG. 3A is a graph illustrating an example of indicators of exercise information in which a speed and a pitch of day 1 are illustrated.
Figure 3C:
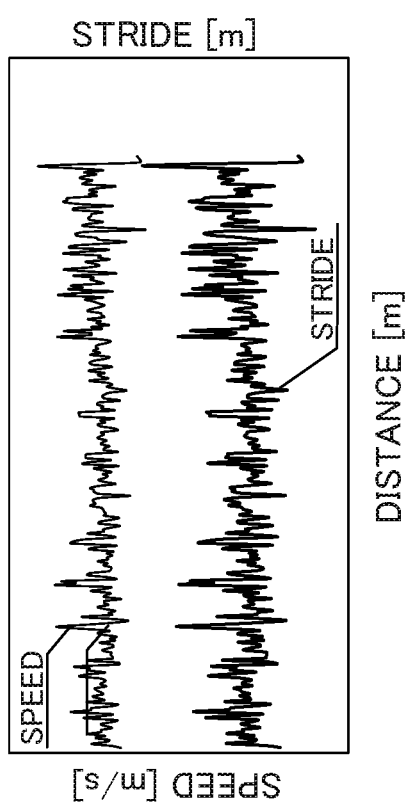
FIG. 3C is a graph illustrating an example of the indicators of the exercise information in which the speed and a stride of day 1 are illustrated.
Figure 3B:
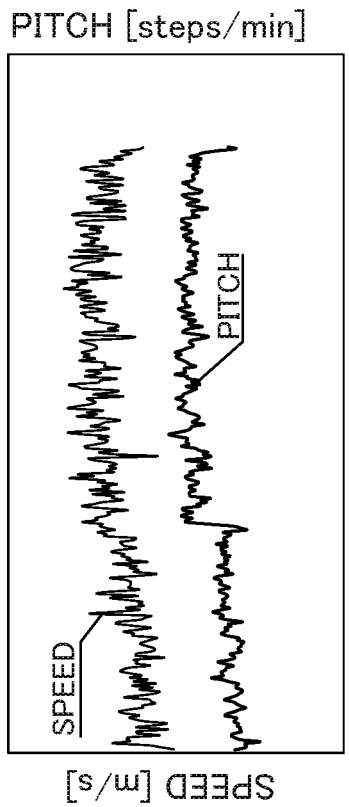
FIG. 3B is a graph illustrating an example of the indicators of the exercise information in which the speed and the pitch of day 2 are illustrated.
Figure 3D:
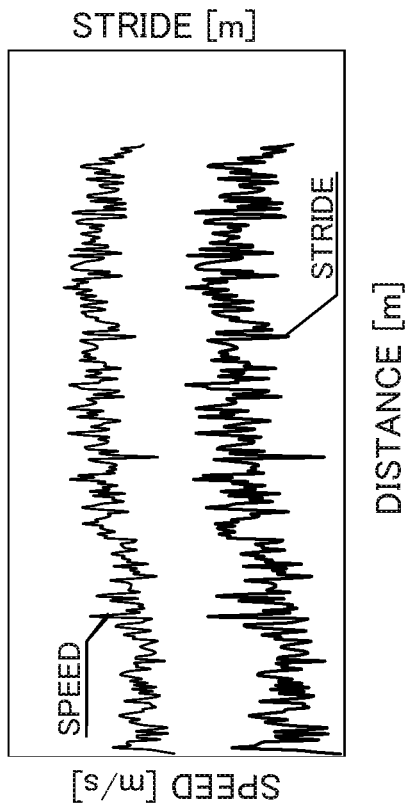
FIG. 3D is a graph illustrating an example of the indicators of the exercise information in which the speed and the stride of day 2 are illustrated.

As illustrated in FIG. 3A, on day 1, the pitch differs for the first half and the second half. The pitch is higher in the second half. In contrast, as illustrated in FIG. 3B, on day 2, the pitch is substantially constant from beginning to end.

Based solely on these facts, a conclusion is made that the pitch is low for the first half of day 1 but, in actuality, the running speed of day 1 also differs for the first half and the second half. The running speed is faster in the second half. Meanwhile, on day 2, a substantially constant speed is maintained for the total distance. Since the pitch itself decreases as the running speed decreases, comparing the pitch of the first half of day 1 as-is with other intervals is meaningless and such a simple comparison is not possible. In actuality, in order to compare whether the pitch of running on a certain day is high or low, pitches at the same speed must be compared.

In the present embodiment, the first indicator is set as the speed, and the second indicator is set as an indicator that expresses exercise information and that has correlation with the speed, such as the pitch, the stride, the stride-height ratio, the up-down motion, the up-down motion-height ratio, the left-right motion, the front-back motion, the ground contact time, the leg swing time, the ground contact time rate, the leg swing time rate, the amount of deceleration, the amount of sinking, the sinking amount-height ratio, the sinking time, the braking time, the propelling time, the ground contact impact, the kick-off acceleration, the kick-off time, the amount of pelvic rotation, the stiffness, the stiffness-weight ratio, the ground contact angle, the kick-off angle, the total impulse, the propulsion impulse, the deceleration impulse, the up-down impulse, the left-right impulse, the left-right direction impact, the amount of backward trunk tilt, the amount of pelvic depression, the amount of pelvic lifting, the pelvic rotation timing after ground contact, the forward tilt, the impact peak tilt, or the like.

Figure 4A:
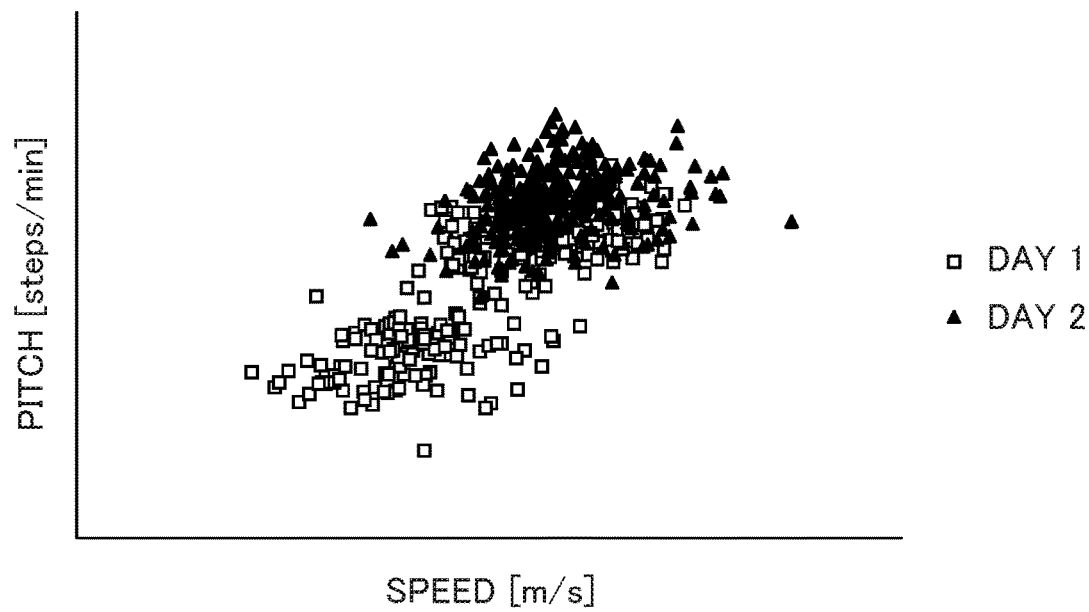
FIG. 4A is a graph illustrating an example of dependency of a second indicator on a first indicator, specifically dependency of the pitch on the speed.
Figure 4B:
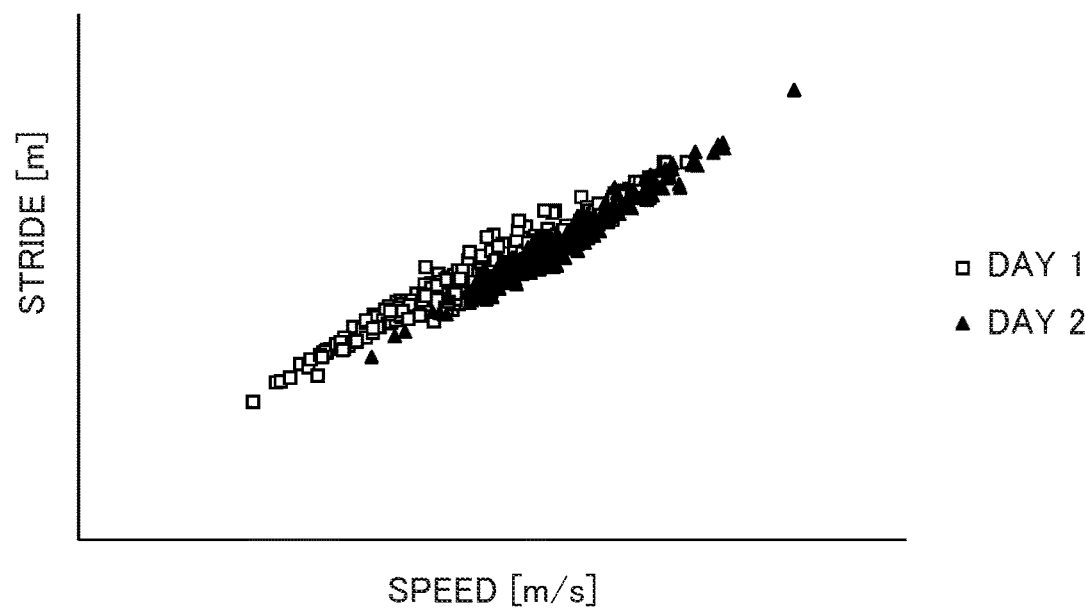
FIG. 4B is a graph illustrating an example of dependency of a second indicator on a first indicator, specifically dependency of the stride on the speed.

FIG. 4 illustrates an example of dependency of the second indicator on the first indicator, that is, illustrates the relationship between the first indicator and the second indicator. FIG. 4A is a graph illustrating the dependency of the pitch (the second indicator) on the speed (the first indicator), and FIG. 4B is a graph illustrating the dependency of the stride (the second indicator) on the speed (the first indicator). The white squares represent the data of day 1, and the black triangles represent the data of day 2. From FIGS. 4A and 4B, it is clear that the aspects of the pitch and the stride with respect to the speed are different for day 1 and day 2. The period-specific model 242 generated by the model generator 212 quantitatively expresses the aspect of the second indicator with respect to the first indicator in any period.

Figure 5:
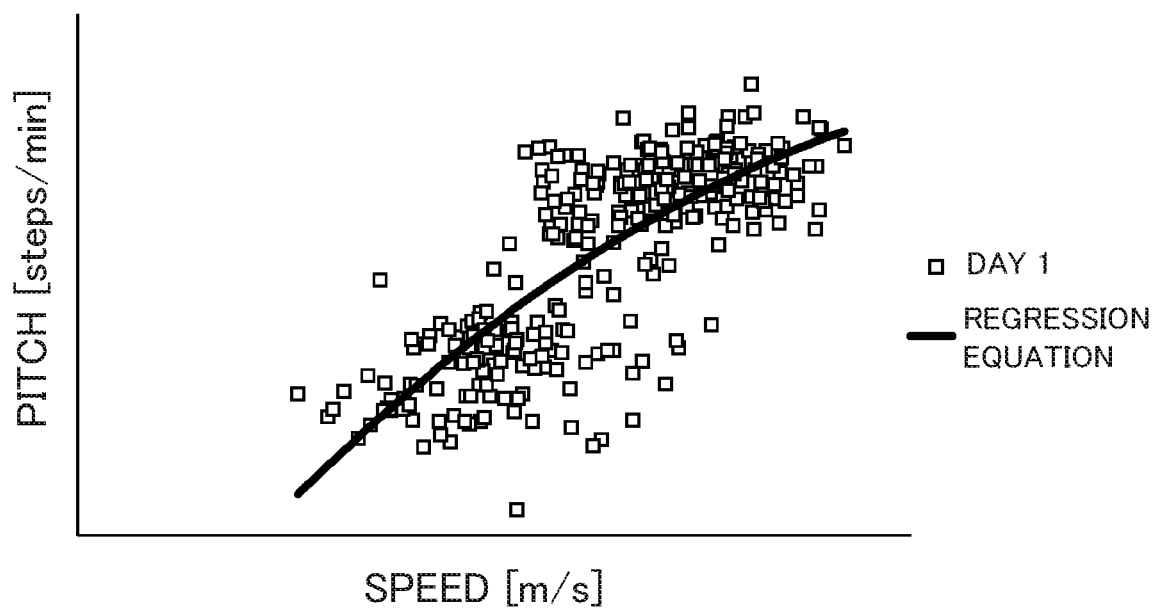
FIG. 5 is a graph illustrating the dependency of the pitch of day 1 on the speed.

FIG. 5 is a graph illustrating the dependency on the speed of the pitch of day 1 of FIG. 4, and illustrates values of the indicators and a polynomial regression line obtained by regression analysis. In this case, a second-order regression equation is used. The regression equation expressed by this regression line is the period-specific model 242 of day 1 whereby the pitch can be obtained as the output in a case where the speed is the input. Thus, for any period, the model generator 212 generates a regression equation that serves as the period-specific model 242 whereby the second indicator can be obtained as the output in the case where the first indicator is the input.

The parameter specifier 213 of the controller 210 specifies, on the basis of an input from an operator received by the operation device 270 in a case where a parameter input screen is displayed on the display 260, the parameters of the data to be displayed on the display 260. Specifically, the parameter specifier 213 specifies the first indicator, the second indicator, the first period, and the second period for selecting the period-specific model 242. The parameter specifier 213 specifies the value of the first indicator that is the input for deriving estimation data expressing the second indicator in that period using the selected period specific model 242.

The first deriver 214 acquires, on the basis of the parameters specified by the parameter specifier 213, the period-specific model 242 (first model) in which the first indicator is the input and the second indicator is the output in the first period. Then, the first deriver 214 uses the acquired period-specific model 242 to derive first estimation data expressing the second indicator in the first period for a case in which the first indicator is assumed to be a certain value specified by the parameter specifier 213.

The second deriver 215 acquires, on the basis of the parameters specified by the parameter specifier 213, the period-specific model 242 (second model) in which the first indicator is the input and the second indicator is the output in the second period. Then, the second deriver 215 uses the acquired period-specific model 242 to derive second estimation data expressing the second indicator in the second period for a case in which the first indicator is assumed to be the certain value specified by the parameter specifier 213.

The data presentation controller 216 presents the first estimation data derived by the first deriver 214 and the second estimation data derived by the second deriver 215 on the display 260 (a presenter) in a mutually comparable manner Any data presentation method may be used. For example, a configuration is possible in which the first estimation data and the second estimation data are estimation values, relative to a specific value of the first indicator, of the second indicator in the first period and the second period, and the data presentation controller 216 presents these two estimation values of the second indicator side-by-side on the display 260. Alternatively, a configuration is possible in which the data presentation controller 216 displays estimation data including a plurality of estimation values on the display 260 as a graph. FIGS. 6 to 11 illustrate data presentation examples.

Figure 6:
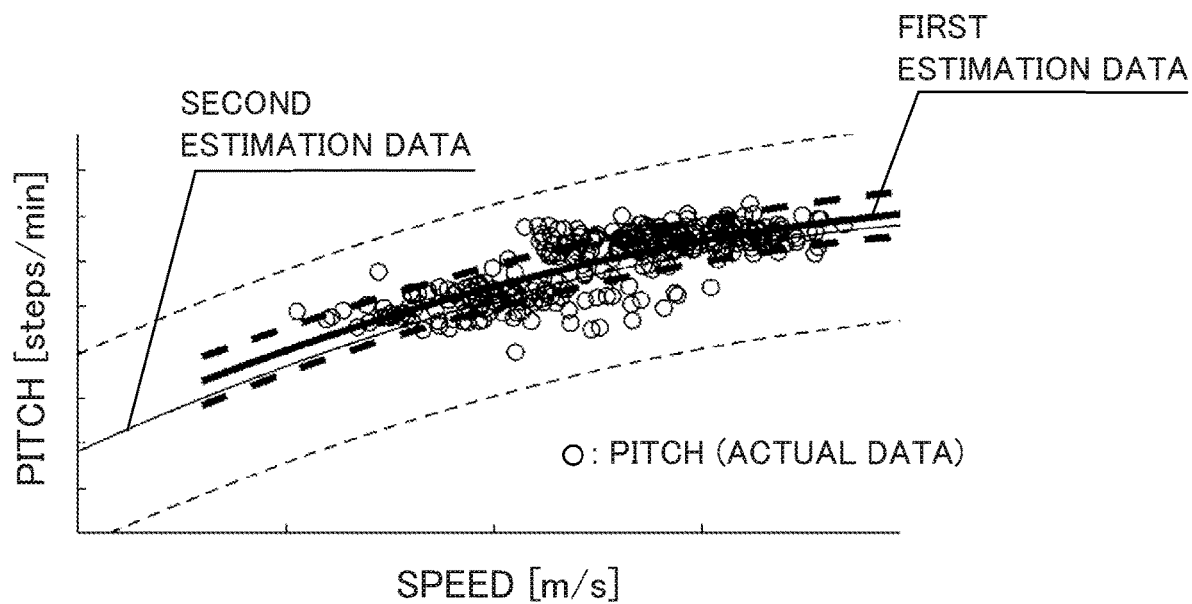
FIG. 6 is a data presentation example of first estimation data and second estimation data.

FIG. 6 is a data presentation example of a case in which the parameter specifier 213 specifies the speed as the first indicator, the pitch as the second indicator, day 1 as the first period, and all running days as the second period; and the first indicator has a value in a certain range. Note that, as in the case of FIG. 3, the first period and the second period in the example of FIG. 6 are periods for which the date and times are mutually different, for a case in which the conditions, except for the date and time, under which the subject exercises are the same. The first deriver 214 acquires the regression equation that is the first model and that is obtained from the exercise data 241 of the pitch of day 1 that is dependent on the speed. Then, the first deriver 214 obtains first estimation data that is the second indicator for a case in which values of the first indicator, namely the speed, are in the certain range. Specifically, the first deriver 214 substitutes the value of the first indicator into the regression equation that is the first model to obtain the first estimation data of the value of the second indicator. The data presentation controller 216 displays, on the display 260, the first estimation data as the bold line of FIG. 6. The data presentation controller 216 may display, on the display 260 and together with the first estimation data, data expressing a variation range (first variation range) of the exercise data 241 relative to the first estimation data (bold dashed lines of FIG. 6).

The second deriver 215 acquires the regression equation that is the second model, obtained from the exercise data 241 of the pitch on all running days that is dependent on the speed. Then, the second deriver 215 obtains second estimation data that is the second indicator for a case in which values of the first indicator, namely the speed, are in the certain range, and the data presentation controller 216 displays, on the display 260, the second estimation data as the thin line of FIG. 6. The data presentation controller 216 may display, on the display 260 and together with the second estimation data, data expressing a variation range (second variation range) of the exercise data 241 relative to the second estimation data (thin dashed lines of FIG. 6).

The data presentation controller 216 may also present (display on the display 260) actual data of the pitch of the first period or the second period (the exercise data 241). FIG. 6 illustrates the actual data of the first period using a marker.

Figure 7:
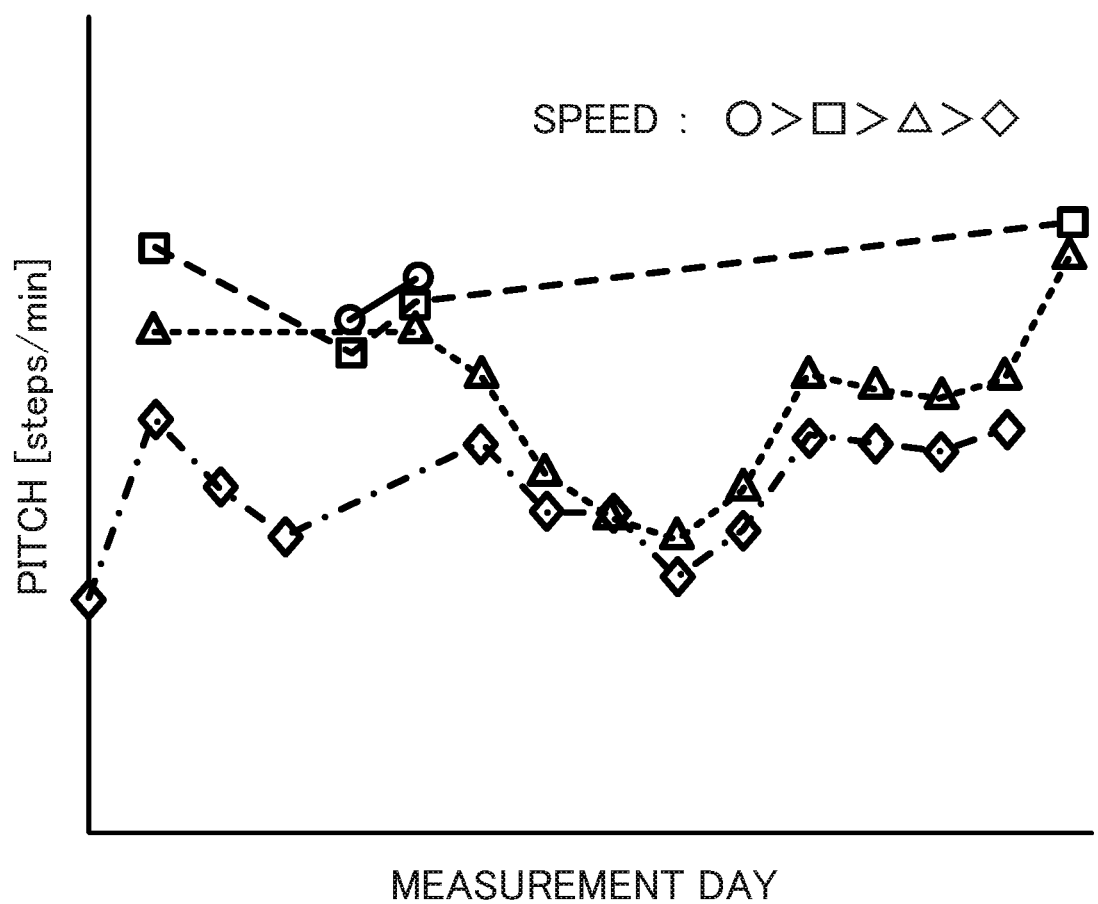
FIG. 7 is another data presentation example.
Figure 8:
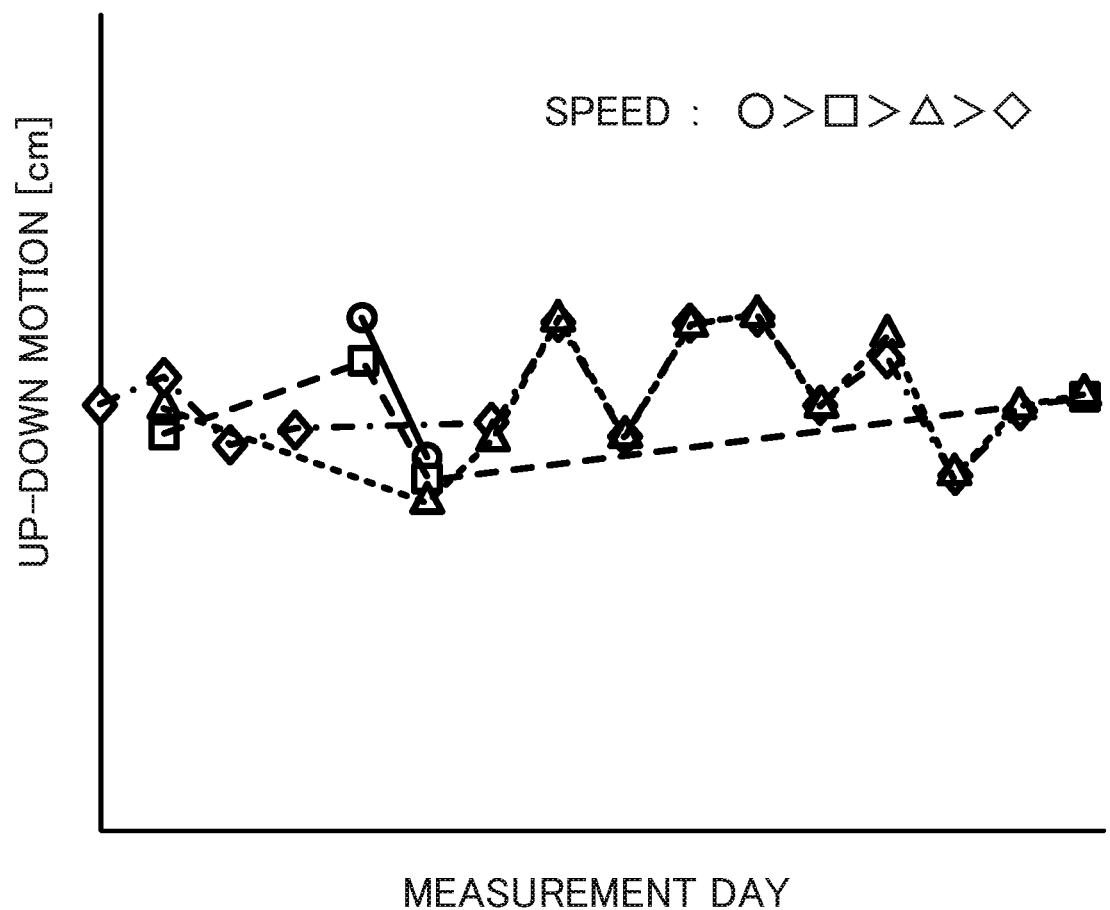
FIG. 8 is another data presentation example.
Figure 9:
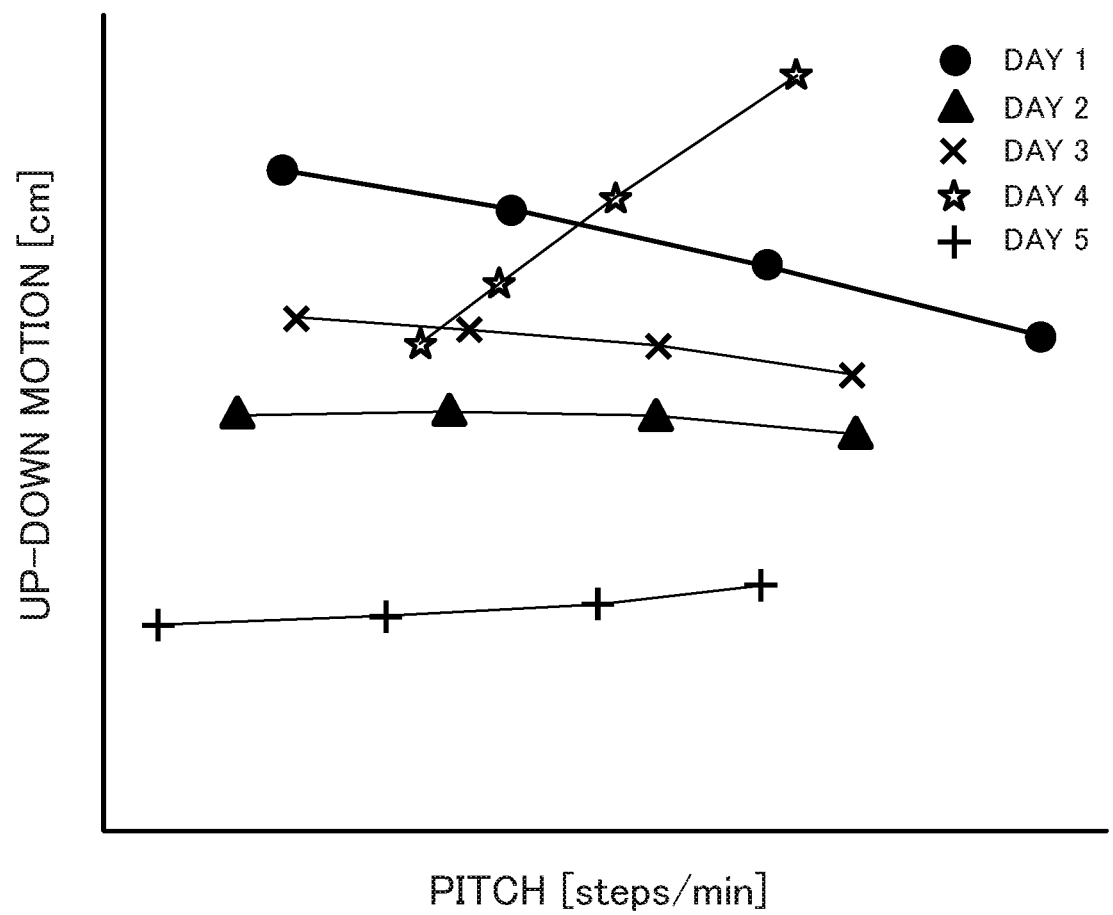
FIG. 9 is another data presentation example.

FIGS. 7 to 9 illustrate other presentation examples. In FIG. 2, the first deriver 214 uses the first model (the period-specific model 242) of the first period to derive the first estimation data, and the second deriver 215 uses the second model (the period-specific model 242) of the second period to derive the second estimation data. However, a configuration is possible in which multiple derivers are provided, and the multiple derivers use the period-specific models 242 of multiple periods to derive respective pieces of estimation data.

FIGS. 7 and 8 are data presentation examples of cases in which multiple derivers use the period-specific models 242 of multiple periods to derive respective pieces of estimation data. FIG. 7 illustrates a case in which the parameter specifier 213 specifies the speed as the first indicator and the pitch as the second indicator, and FIG. 8 illustrates a case in which the first indicator is the speed and the second indicator is the up-down motion. As in the case of FIG. 3, FIGS. 7 and 8 illustrate cases in which the first period, the second period, and subsequent periods are each one day of the measurement days of the horizontal axis, for a case in which the conditions, except for the date and time, under which the subject exercises are the same.

The deriver corresponding to each one day uses each period-specific model 242 in which the first indicator, namely the speed, is the input to derive an estimation value of the second indicator, namely the pitch or the up-down motion. In FIGS. 7 and 8, four types of markers represent the estimation values of the pitch or the up-down motion at mutually different speeds. The speed represented by the circular marker is fastest, and the speed represented by the other various markers decreases in the order of the square marker, the triangular marker, and the diamond marker. The data presentation controller 216 may display, on the display 260 and together with the estimation value of the pitch or the up-down motion that is the first estimation data, data expressing a variation range of the exercise data 241 relative to the estimation value.

In the case of the presentation method illustrated in FIG. 6, the pitch of the running of day 1 is within the overall variation range, but it is clear that it is slightly above average. In the case of the presentation method illustrated in FIG. 7, it is clear that changes in the pitch every day are great at the speed represented by the triangular marker.

Additionally, as another presentation method, the data presentation controller 216 may perform a display for mutually comparing pieces of estimation data of the second indicator in a case of running at a certain speed on various days. For example, as illustrated in FIG. 9, the data presentation controller 216 may display, on the display 260, a graph in which the pitch of every day illustrated in FIG. 7 is the horizontal axis and the corresponding up-down motion of every day illustrated in FIG. 8 is the vertical axis. According to the presentation method illustrated in FIG. 9, it is possible to ascertain how the up-down motion changes with respect to the pitch depending on the day.

In FIG. 9, the four points of the various days have different speeds and, for each day, the speed is slowest at the point where the pitch is the lowest, and the speed increases in a step-like manner in ascending order of the pitch. The point at which the pitch is the lowest on all days is the same speed, and the second point, the third point, and the fourth point are also the same speeds, respectively. According to the example illustrated in FIG. 9, it is clear that the change in the up-down motion of day 4 in a case where the pitch is increased is greater compared to the other days.

Figure 10:
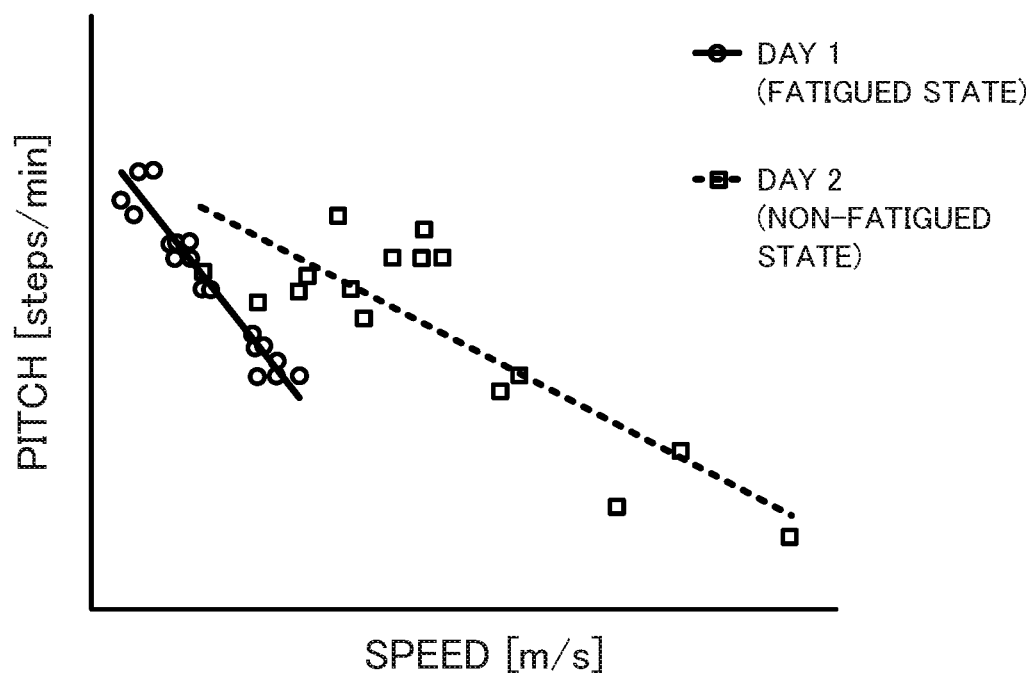
FIG. 10 is a graph illustrating the dependency of the pitch on the speed of various periods in which a condition differs.
Figure 11:
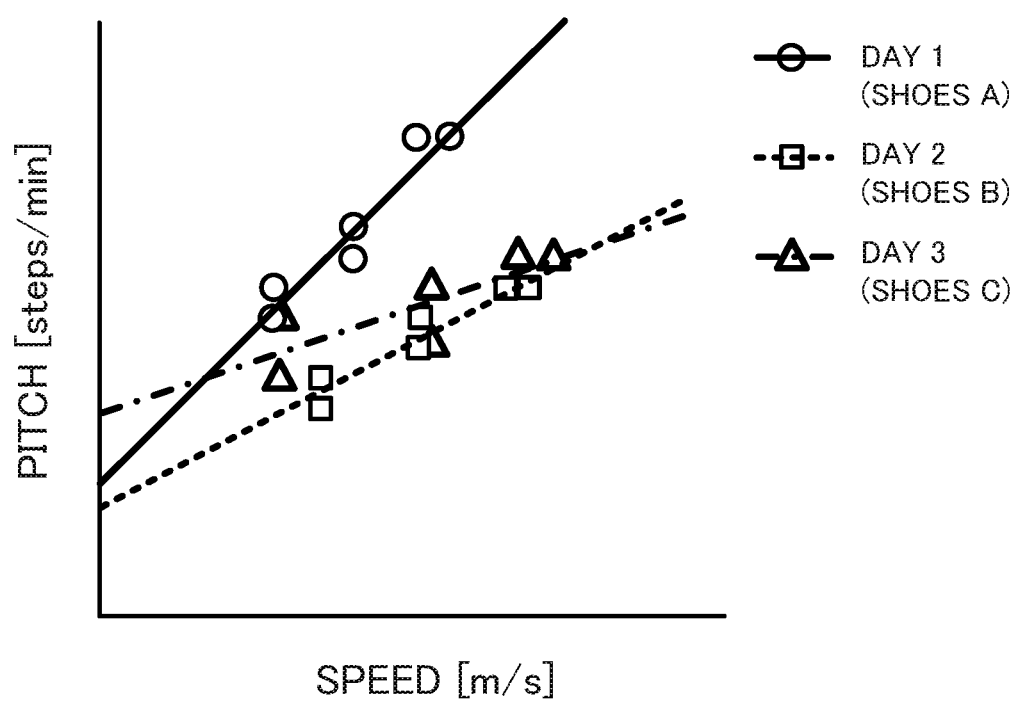
FIG. 11 is a graph illustrating the dependency of the pitch on the speed of various periods in which the condition differs.

FIGS. 10 and 11 are data presentation examples of cases in which the period-specific models 242 of periods in which conditions, other than the date and time, mutually differ are used to derive each piece of the estimation data. In FIG. 10, the first period is a day 1 under the condition that the subject is in the fatigued state, the second period is a day 2 under the condition that the subject is in the non-fatigued state, the first indicator specified by the parameter specifier 213 is the speed and the second indicator specified by the parameter specifier 213 is the pitch. Whether the subject is in the fatigued state is determined on the basis of whether the ground contact time exceeds a predetermined threshold. From the graph of FIG. 10, it is clear that a decline rate of the pitch with respect to increases of the speed is higher on day 1 on which the subject is in the fatigued state.

In FIG. 11, a type of shoes differs for the first period, the second period, and a third period. Specifically, the first period is a day 1 under the condition that shoes A are worn, the second period is a day 2 under the condition that shoes B are worn, and the third period is a day 3 under the condition that shoes C are worn. The first indicator specified by the parameter specifier 213 is the speed, and the second indicator specified by the parameter specifier 213 is the pitch. From the graph of FIG. 11, it is clear that an increase rate of the pitch with respect to increases of the speed is higher in the order of day 1, day 2, and day 3.

Note that, even for periods in which the conditions mutually differ, another indicator other than the pitch illustrated in FIGS. 10 and 11 may be selected as the second indicator and data presentation may be carried out.

Figure 12:
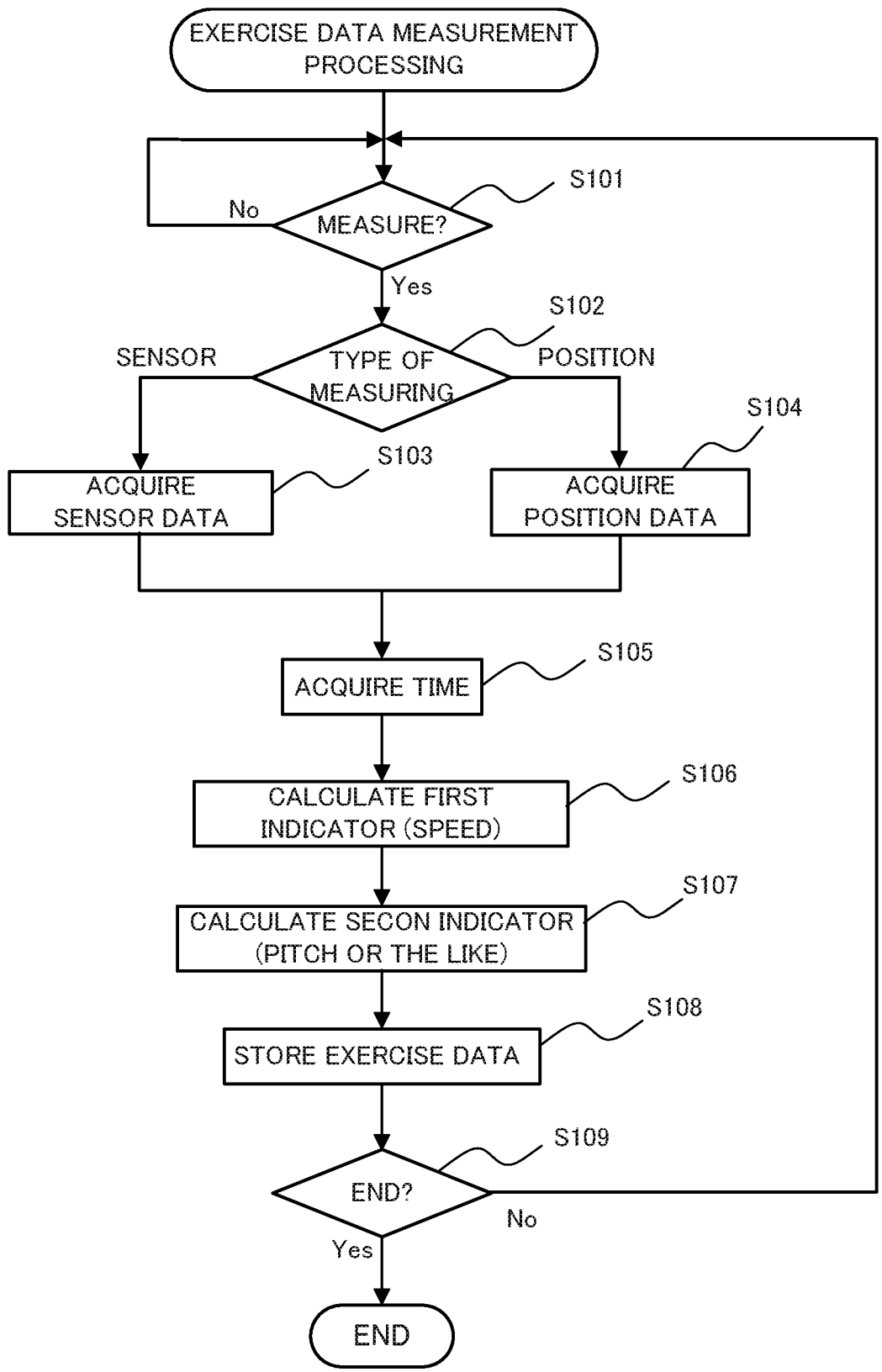
FIG. 12 is a flowchart of exercise data measurement processing.
Figure 13:
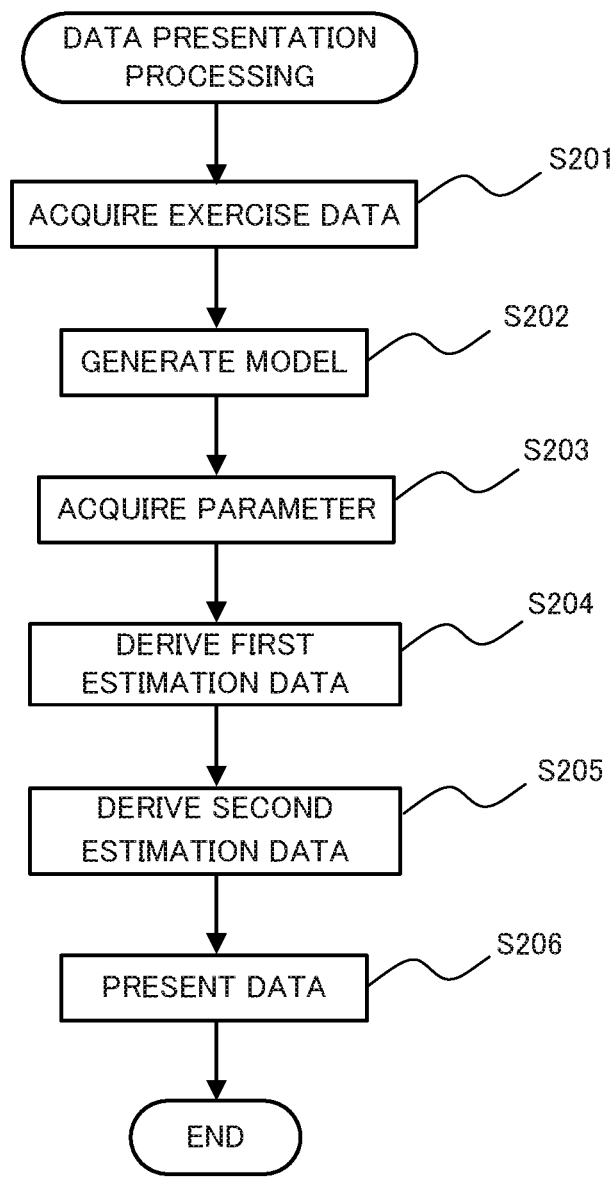
FIG. 13 is a flowchart of data presentation processing.

Next, the operations of the information processing system 1 configured as described above are described while referencing the flowcharts of FIGS. 12 and 13. FIGS. 12 and 13 are flowcharts illustrating an operation example in which moving exercise such as walking or running of the subject is measured.

FIG. 12 is a flowchart of exercise data measurement processing executed by the sensor device 10. The sensor device 10 is worn on the body of the subject and the exercise data measurement processing is executed while the subject is performing moving exercise such as running.

Firstly, the controller 110 of the sensor device 10 determines whether to execute measuring (step S101). In one example, whether to execute measuring is determined on the basis of whether a timing of a predetermined time interval matches. In a case where it is not the timing for executing measuring (step S101: No), the controller 110 waits until the timing of measuring.

In a case where the timing for executing measuring has arrived (step S101: Yes), the controller 110 determines if the type of measuring is measuring by sensor or measuring of the position (step S102). In a case where the type of measuring is measuring by sensor (step S102: Sensor), the controller 110 acquires the sensor data output by the sensor 120 (step S103). In a case where the type of measuring is measuring of position (step S102: Position), the controller 110 acquires the position data output by the position information acquirer 130 (step S104). Here, in a case where the sensor 120 includes a sensor for condition determination such as a temperature sensor, a humidity sensor, a direction sensor, a barometric pressure sensor, an anemometer, or the like, the controller 110 may also acquire these pieces of sensor data.

Next, the controller 110 acquires the time from a built-in clock (step S105). Then, the controller 110 calculates, on the basis of the position data acquired in step S104 and the time acquired in step S105, the speed that is the first indicator expressing the speed of the movement of the subject (first exercise information) (step S106).

Next, the controller 110 calculates, on the basis of the sensor data acquired in step S103 and the time acquired in step S105, the second indicator expressing second exercise information that has correlation with the first indicator (step S107). In one example, the second exercise information is a number of steps per unit time at a time of movement of the subject, and the second indicator in this case is the pitch.

The controller 110 generates exercise data in which indicators, from among the first indicator calculated in step S106 and the second indicator calculated in step S107, for which the time or the distance is the same are associated, and stores the generated exercise data in the storage 140 (step S108). Here, the exercise data may include sensor data related to condition determination.

Thereafter, in a case where there is an end command from the operator (step S109: Yes), the controller 110 ends the processing. However, in a case where there is not an end command from the operator (step S109: No), the controller 110 returns to step S101 and continues the processing. Thus, the sensor device 10 generates the exercise data, stores the exercise data in the storage 140, and sends the exercise data to the information processing device 20 at a desired timing.

FIG. 13 is a flowchart of data presentation processing executed by the information processing device 20. In the information processing device 20, firstly, the exercise data acquirer 211 of the controller 210 acquires, via the communicator 250, the exercise data 241 sent from the sensor device 10 (step S201).

The model generator 212 generates, for every period, a model in which the first indicator is the input and the second indicator is the output. the first indicator and the second indicator being included in the exercise data 241 acquired in step S201 (step S202), and stores the period-specific model 242 in the storage 240. For example, the model generator 212 generates a regression equation as a polynomial regression line by performing regression analysis on the exercise data 241 expressing the relationship between the speed (the first indicator) and the pitch (the second indicator) of the running of day 1 (the first period), and stores the generated regression equation as a first model. Likewise, the model generator 212 generates a regression equation as a polynomial regression line by performing regression analysis on the exercise data 241 expressing the relationship between the speed and the pitch of the running of day 2 (the second period), and stores the generated regression equation as a second model.

Here, the periods for which the model generator 212 generates the period-specific model 242 may be periods for which the date and times differ (or periods for which only the date and times differ), for a case in which the subject exercises under conditions that, except for the date and time, are the same. Alternatively, the periods may be periods in which the subject exercises under a specific condition determined on the basis of the sensor data related to condition determination. Alternatively, the periods may be periods in which the subject exercises under a specific condition determined on the basis of information acquired from an external server using the position information data. Alternatively, the periods may be periods in which the subject exercises under a specific condition determined on the basis of an input performed by the subject or the operator. The condition corresponding to each period is, for example, the condition related to the fatigue state, the worn items, the weather, the elevation, the road surface condition, or the road surface incline, described above. Alternatively, the periods may be periods for which the date and times differ regardless of the conditions other than the date and time.

Next, the parameter specifier 213 uses the period-specific model 242 to acquire a parameter for deriving the estimation data (step S203). Then, the first deriver 214 uses the first model (the period-specific model 242) related to the first period to derive the first estimation data expressing the second indicator for a case in which the first indicator is assumed to be a certain value input as the parameter (step S204). In the present embodiment, the first deriver 214 inputs a certain value of the speed (the first indicator), that is input as the parameter, into the regression equation that is the first model, and derives the pitch (the second indicator) as the first estimation data.

Next, the second deriver 215 uses the second model (the period-specific model 242) related to the second period to derive the second estimation data expressing the second indicator for a case in which the first indicator is assumed to be the certain value input as the parameter (step S205). In the present embodiment, the second deriver 215 inputs the certain value of the speed, that is input as the parameter, into the regression equation that is the second model, and derives the pitch as the second estimation data.

Lastly, the data presentation controller 216 performs data display control so as to display, on the display 260, the first estimation data derived in step S204 and the second estimation data derived in step S205 in a manner that allows comparison (step S206), and ends the processing.

As described above, in the information processing device 20 according to the present embodiment, the first deriver 214 derives, on the basis of the first model (the period-specific model 242) generated with the first indicator expressing the first exercise information of the subject acquired in the first period as the input, and the second indicator expressing the second exercise information, different than the first exercise information, and having correlation with the first indicator as the output, the first estimation data expressing the second indicator in the first period, for a case in which the first indicator is assumed to be a certain value in the first period. Additionally, the second deriver 215 derives, on the basis of the second model (the period-specific model 242) generated with the first indicator acquired in the second period as the input and the second indicator acquired in the second period as the output, second estimation data expressing the second indicator in the second period, for a case in which the first indicator is assumed to be the certain value in the second period. Moreover, the data presentation controller 216 presents the first estimation data of the first period derived by the first deriver 214 and the second estimation data of the second period derived by the second deriver 215 in a mutually comparable manner on the display 260. This configuration makes it possible to appropriately evaluate changes over time in the exercise state of the subject in accordance with the relationship between the first indicator and second indicator that express the mutually different exercise state.

In the information processing device 20 according to the present embodiment, the first model and the second model are set as the first regression equation and the second regression equation generated in each period by performing regression analysis on the first indicator and the second indicator measured in association with the first indicator. Due to this, it is possible to uniquely obtain the first estimation data and the second estimation data using the first regression equation and the second regression equation.

In the information processing device 20 according to the present embodiment, the first indicator and the second indicator for acquiring the first model and the first indicator and the second indicator for acquiring the second model are pieces of data acquired on the basis of outputs, during moving exercise, of the sensor 120 and the position information acquirer 130 attached to the subject. This configuration makes it possible to appropriately evaluate changes over time of the exercise state of the subject related to moving exercise of the subject.

In the information processing device 20 according to the present embodiment, the data presentation controller 216 presents, as the first estimation data or the second estimation data, the estimation value of the second indicator for a case in which the first indicator is assumed to be a certain value or, alternatively, presents, as the first estimation data or the second estimation data, a graph illustrating the estimation value of the second indicator relative to each value of the first indicator in a case in which the first indicator is in a certain range. This configuration makes it possible to select the presentation manner in accordance with the purpose or target of the evaluation, and appropriately evaluate the exercise state.

In addition to presenting the first estimation data and the second estimation data in a mutually comparable manner, the data presentation controller 216 presents at least one of the first variation range that is the variation range, relative to the first estimation data, of the exercise data 241 expressing the relationship between the first indicator and the second indicator, and the second variation range that is the variation range of the exercise data 241 relative to the second estimation data. This configuration makes it possible to appropriately evaluate the exercise state on the basis of not only the first estimation data and the second estimation data, but also the information of the exercise data 241 that includes the actual measurement values.

Embodiment 2

Hereinafter, an information processing device 30 according to Embodiment 2 is described in detail while referencing FIG. 14. Note that, in the drawings, identical or corresponding components are denoted with the same reference numerals. The information processing device 30 according to Embodiment 2 is a device that is worn in the body of an organism to be measured (a subject) and presents data expressing changes over time in an exercise state of the subject.

Figure 14:
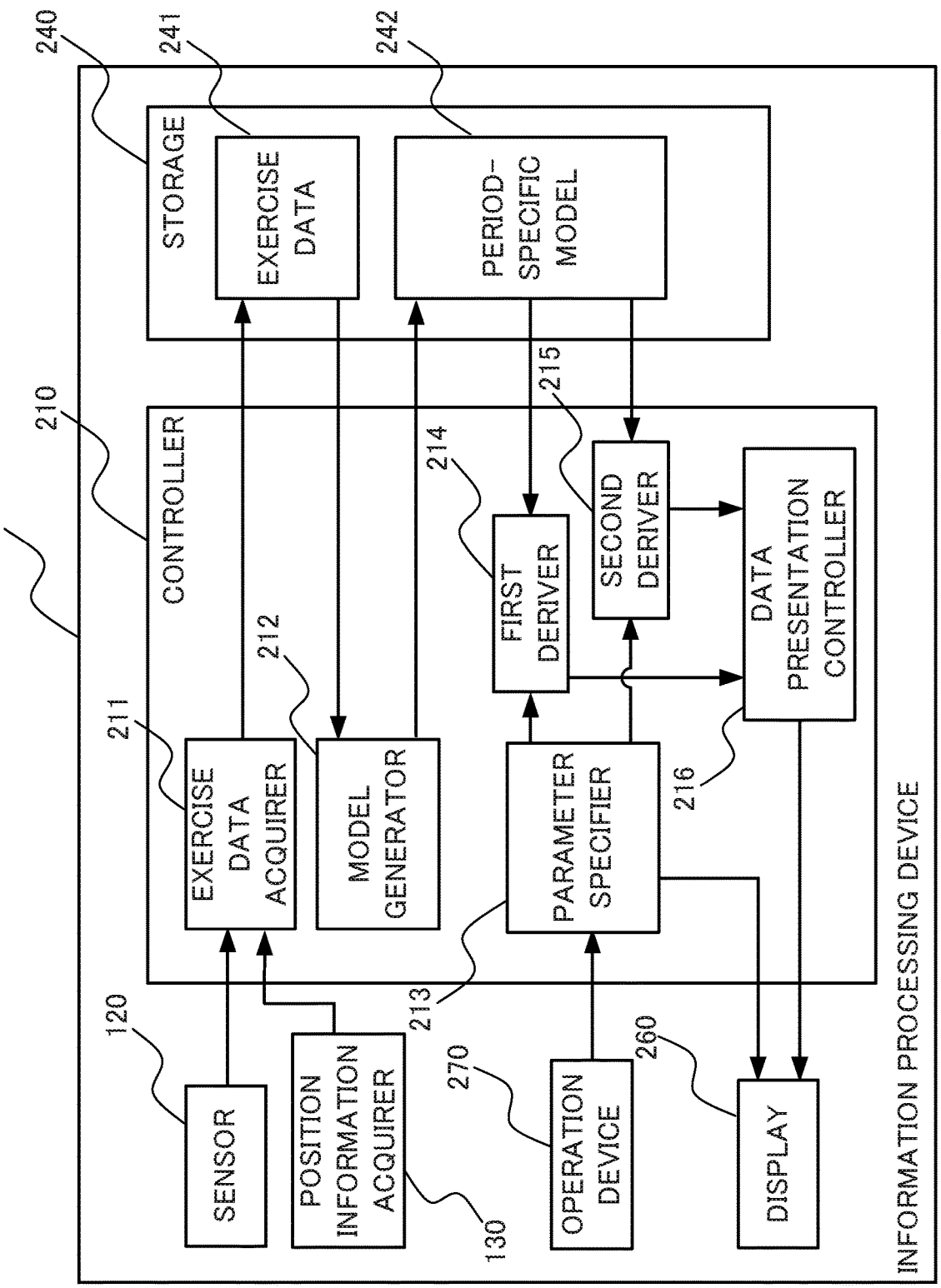
FIG. 14 is a block diagram illustrating the functional configuration of an information processing device according Embodiment 2.

As illustrated in FIG. 14, the information processing device 30 according to Embodiment 2 includes the sensor 120 and the position information acquirer 130 that are included in the sensor device 10 according to Embodiment 1. The other configurations are the same as the information processing device 20 according to Embodiment 1.

The information processing device 30 configured as described above executes the exercise data measurement processing (FIG. 12) executed by the sensor device 10 in Embodiment 1 and the data presentation processing (FIG. 13) executed by the information processing device 20 in Embodiment 1.

Specifically, the exercise data acquirer 211 of the information processing device 30 calculates the speed that is the first indicator and the pitch or the like that is the second indicator on the basis of the sensor data output by the sensor 120 and the position data output by the position information acquirer 130, acquires the exercise data 241 in which the calculated first indicator and second indicator are associated with each other, and stores the acquired exercise data 241 in the storage 240.

Next, in the information processing device 30, the model generator 212 generates, on the basis of the exercise data 241, the period-specific model 242 in which the first indicator is the input and the second indicator is the output, and stores the generated period-specific model 242 in the storage 240. The first deriver 214 and the second deriver 215 use the period-specific model 242 to derive each of the first estimation data and the second estimation data on the basis of the first period, the second period, and the value of the first indicator specified by the parameter specifier 213. Then, the data presentation controller 216 displays, on the display 260, the first estimation data and the second estimation data in a comparable manner.

As described above, the information processing device 30 according to the Embodiment 2 is a device that is worn on the body of the subject, generates the exercise data 241 on the basis of the outputs of the sensor 120 and the position information acquirer 130, and generates the period-specific model 242 on the basis of the exercise data 241. The information processing device 30 uses the period-specific model 242 of the first period to derive, as the first estimation data, the second indicator with respect to the specified first indicator, uses the period-specific model 242 of the second period to derive, as the second estimation data, the second indicator of the second period with respect to the specified first indicator, and performs data presentation of the derived first estimation data and the second estimation data in a mutually comparable manner Thus, due to the information processing device 30 worn by the subject, it is possible to appropriately evaluate changes over time in the exercise information of the subject in accordance with the relationship between a plurality of mutually different exercise states.

Modified Examples

Embodiments of the present disclosure are described above, but these embodiments are merely examples and do not limit the scope of application of the present disclosure. That is, various applications of the embodiments of the present disclosure are possible, and all embodiments are included in the scope of the present disclosure.

For example, in Embodiment 1, in the sensor device 10, the exercise data, in which the indicators expressing various types of exercise information are associated with each other, is generated on the basis of the sensor data output by the sensor 120 and the position data output by the position information acquirer 130, and send to the information processing device 20. However, a configuration is possible in which the sensor data and the position data are sent as-is from the sensor device 10 to the information processing device 20, and the information processing device 20 generates the exercise data.

In Embodiments 1 and 2, the period-specific model 242 generated by the model generator 212 is a regression equation obtained by performing regression analysis on data expressing the dependency of the second indicator on only the first indicator. However, a configuration is possible in which the period-specific model 242 is a regression equation obtained by performing regression analysis (multiple regression analysis) on data expressing the dependency of the second indicator on a plurality of indicators.

Furthermore, a configuration is possible in which the period-specific model 242 generated by the model generator 212 is a model generated by any other method. For example, a configuration is possible in which the period-specific model 242 is a model, for example, a neural network, that is generated by performing machine learning using training data, and in which the first indicator is the input and the second indicator is the output.

In Embodiments 1 and 2, the information processing device 20, 30 includes the display 260 and the operation device 270. However, a configuration is possible in which another terminal that is communicably connected to the information processing device 20, 30 includes the display 260 and the operation device 270. For example, a configuration is possible in which the information processing device 20, 30 is constituted by a server, a user terminal that is communicably connected to the server includes the display 260 and the operation device 270, and the first estimation data and the second estimation data generated by the server on the basis of an input on the operation device 270 of the user terminal are displayed on the display 260 of the user terminal.

In Embodiments 1 and 2, a case is described in which the display 260 that is the presenter of the information processing device 20, 30 displays the first estimation data and the second estimation data using an image including a graph, but any presentation method may be used to present the first estimation data and the second estimation data. For example, numerical values may be presented as character displays or by speech.

In Embodiments 1 and 2, the sensor device 10 is a device that is worn on the waist of a person. However, a configuration is possible in which the sensor device 10 is a device that is worn on another part of the subject such as an arm, a leg, or the like. Another configuration is possible in which the sensor device 10 includes a plurality of sensors to be worn on parts of a plurality of locations of the subject. Additionally, the sensor device 10 is not limited to being worn by a person, and a configuration is possible in which the sensor device 10 is worn by a subject other than a person and outputs the exercise data of that subject.

In Embodiments 1 and 2, the information processing device 20, 30 performs a comparative display of the first period and the second period (day 1 and day 2), but a configuration is possible in which a comparative display of data of each of three or more mutually different periods, such as day 1, day 2, day 3, and the like is performed.

The hardware configurations and flowcharts illustrated in Embodiments 1 and 2 are examples and can be changed or modified as desired. The various functions realized by the controller 110, 210 can be realized using a typical computer system, without requiring a dedicated system.

For example, a computer may be configured that is capable of realizing these various features by storing and distributing a program for executing the operations of Embodiments 1 and 2 on a non-transitory computer-readable medium such as a compact disc read-only memory (CD-ROM), a digital versatile disc (DVD), a magneto optical disc (MO), a memory card, or the like, and installing the program on the computer. Moreover, in cases in which the various functions are realized by being divided between an operating system (OS) and an application, or are realized by cooperation between an OS and an application, it is possible to store only the portion other than the OS on the non-transitory recording medium.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An information processing system, comprising:
   a wearable sensor device configured to be worn on a body of a subject and which includes:
      a motion sensor configured to detect motion of the subject,
      a position sensor configured to acquire a current position of the subject based on a GPS signal, and
      a condition determination sensor for detecting condition information related to a condition under which the subject performs the motion; and
   at least one processor configured to:
   generate time-series exercise data based on output from the wearable sensor device, wherein, in generating the time-series exercise data, the at least one processor calculates a plurality of indicators based on at least acceleration data output from the motion sensor and position data output from the position sensor, the plurality of indicators including at least a first indicator expressing a first exercise metric and a second indicator which has a correlative relationship with the first indicator and which expresses a second exercise metric other than the first exercise metric;
   generate a first period-specific model using the time-series exercise data from a first time period which is selected based on the condition information, wherein the first period-specific model is trained to express a relationship between the first indicator and the second indicator in the first time period using values of the first indicator in the time-series exercise data from the first time period as input and using values of the second indicator in the time-series exercise data from the first time period as output, and is structured to receive a value of the first indicator as an input and to generate a value of the second indicator as an output;

generate a second period-specific model using the time-series exercise data from a second time period other than the first time period and which is selected based on the condition information, wherein the second period-specific model is trained to express a relationship between the first indicator and the second indicator in the second time period using values of the first indicator in the time-series exercise data from the second time period as input and using values of the second indicator in the time-series exercise data from the second time period as output, and is structured to receive a value of the first indicator as an input and to generate a value of the second indicator as an output;

store the generated first period-specific model and second period-specific model in a memory;

receive, via a user interface, input of a value of the first indicator;

generate first estimation data by inputting the value of the first indicator received via the user interface into the stored first period-specific model, to obtain an estimated value of the second indicator that corresponds to the input value of the first indicator in the first time period as the first estimation data;

generate second estimation data by inputting the value of the first indicator received via the user interface into the stored second period-specific model, to obtain an estimated value of the second indicator that corresponds to the input value of the first indicator in the second time period as the second estimation data;

perform display control to display, on a display, the generated first estimation data and the generated second estimation data in a mutually comparable graphical format.

2. The information processing system according to claim 1, wherein
the first period-specific model is a first regression equation generated by performing regression analysis on the values of the first indicator in the time-series exercise data from the first time period and the values of the second indicator in the time-series exercise data from the first time period, and
the second period-specific model is a second regression equation generated by performing regression analysis on the values of the first indicator in the time-series exercise data from the second time period and the values of the second indicator in the time-series exercise data from the second time period.

3. The information processing system according to claim 1, wherein
the at least one processor is configured to
perform display control to display, on the display, as the first estimation data, a graph expressing estimation values of the second indicator in the first period, derived by inputting values of the first indicator within a certain range into the first period-specific model, and
perform control to display, on the display, as the second estimation data, a graph expressing estimation values of the second indicator in the second period, derived by inputting the values of the first indicator within the certain range into the second period-specific model.

4. The information processing system according to claim 1, wherein
the at least one processor is configured to
perform display control to display, on the display, in addition to the generated first estimation data and the generated second estimation data displayed in the mutually comparable graphical format, at least one of a first variation range that is a variation range, relative to the first estimation data, of the time-series exercise data, and a second variation range that is a variation range, relative to the second estimation data, of the time-series exercise data.

5. The information processing system according to claim 3, wherein
the at least one processor is configured to
perform display control to display, on the display, in addition to the generated first estimation data and the generated second estimation data in a mutually comparable graphical format, at least one of a first variation range that is a variation range, relative to the first estimation data, of the time-series exercise data, and a second variation range that is a variation range, relative to the second estimation data, of the time-series exercise data.

6. The information processing system according to claim 1, wherein
the time-series exercise data is related to a moving exercise of the subject,
the first indicator is a speed of the moving exercise, and
the second indicator is one of a pitch, a stride, a stride-height ratio, an up-down motion, an up-down motion-height ratio, a left-right motion, a front-back motion, a ground contact time, a leg swing time, a ground contact time rate, a leg swing time rate, an amount of deceleration, an amount of sinking, a sinking amount-height ratio, a sinking time, a braking time, a propelling time, a ground contact impact, a kick-off acceleration, a kick-off time, an amount of pelvic rotation, a stiffness, a stiffness-weight ratio, a ground contact angle, a kick-off angle, a total impulse, a propulsion impulse, a deceleration impulse, an up-down impulse, a left-right impulse, a left-right direction impact, an amount of backward trunk tilt, an amount of pelvic depression, an amount of pelvic lifting, a pelvic rotation timing after ground contact, a forward tilt, and an impact peak tilt, the second indicator having a correlative relationship with the speed.

7. The information processing system according to claim 3, wherein
the time-series exercise data is related to a moving exercise of the subject,
the first indicator is a speed of the moving exercise, and
the second indicator is one of a pitch, a stride, a stride-height ratio, an up-down motion, an up-down motion-height ratio, a left-right motion, a front-back motion, a ground contact time, a leg swing time, a ground contact time rate, a leg swing time rate, an amount of deceleration, an amount of sinking, a sinking amount-height ratio, a sinking time, a braking time, a propelling time, a ground contact impact, a kick-off acceleration, a kick-off time, an amount of pelvic rotation, a stiffness, a stiffness-weight ratio, a ground contact angle, a kick-off angle, a total impulse, a propulsion impulse, a deceleration impulse, an up-down impulse, a left-right impulse, a left-right direction impact, an amount of backward trunk tilt, an amount of pelvic depression, an amount of pelvic lifting, a pelvic rotation timing after ground contact, a forward tilt, and an impact peak tilt, the second indicator having a correlative relationship with the speed.

8. The information processing system according to claim 4, wherein the time-series exercise data is related to a moving exercise of the subject, the first indicator is a speed of the moving exercise, and the second indicator is one of a pitch, a stride, a stride-height ratio, an up-down motion, an up-down motion-height ratio, a left-right motion, a front-back motion, a ground contact time, a leg swing time, a ground contact time rate, a leg swing time rate, an amount of deceleration, an amount of sinking, a sinking amount-height ratio, a sinking time, a braking time, a propelling time, a ground contact impact, a kick-off acceleration, a kick-off time, an amount of pelvic rotation, a stiffness, a stiffness-weight ratio, a ground contact angle, a kick-off angle, a total impulse, a propulsion impulse, a deceleration impulse, an up-down impulse, a left-right impulse, a left-right direction impact, an amount of backward trunk tilt, an amount of pelvic depression, an amount of pelvic lifting, a pelvic rotation timing after ground contact, a forward tilt, and an impact peak tilt, the second indicator having a correlative relationship with the speed.

9. The information processing system according to claim 1, further comprising the display.

10. A method executed by an information processing system comprising (A) a wearable sensor device configured to be worn on a body of a subject and which includes: (i) a motion sensor configured to detect motion of the subject, (ii) a position sensor configured to acquire a current position of the subject based on a GPS signal, and (iii) a condition determination sensor for detecting condition information related to a condition under which the subject performs the motion, and (B) at least one processor, the method comprising:

generating time-series exercise data based on output from the wearable sensor device, wherein, in generating the time-series exercise data, the at least one processor calculates a plurality of indicators based on at least acceleration data output from the motion sensor and position data output from the position sensor, the plurality of indicators including at least a first indicator expressing a first exercise metric and a second indicator which has a correlative relationship with the first indicator and which expresses a second exercise metric other than the first exercise metric;

generating a first period-specific model using the time-series exercise data from a first time period which is selected based on the condition information, wherein the first period-specific model is trained to express a relationship between the first indicator and the second indicator in the first time period using values of the first indicator in the time-series exercise data from the first time period as input and using values of the second indicator in the time-series exercise data from the first time period as output, and is structured to receive a value of the first indicator as an input and to generate a value of the second indicator as an output;

generating a second period-specific model using the time-series exercise data from a second time period other than the first time period and which is selected based on the condition information, wherein the second period-specific model is trained to express a relationship between the first indicator and the second indicator in the second time period using values of the first indicator in the time-series exercise data from the second time period as input and using values of the second indicator in the time-series exercise data from the second time period as output, and is structured to receive a value of the first indicator as an input and to generate a value of the second indicator as an output;

storing the generated first period-specific model and second period-specific model in a memory;

receiving, via a user interface, input of a value of the first indicator;

generating first estimation data by inputting the value of the first indicator received via the user interface into the stored first period-specific model, to obtain an estimated value of the second indicator that corresponds to the input value of the first indicator in the first time period as the first estimation data;

generating second estimation data by inputting the value of the first indicator received via the user interface into the stored second period-specific model, to obtain an estimated value of the second indicator that corresponds to the input value of the first indicator in the second time period as the second estimation data; and performing display control to display, on a display, the generated first estimation data and the generated second estimation data in a mutually comparable graphical format.

11. A non-transitory computer-readable recording medium storing a program that is executable by a computer of an information processing system comprising a wearable sensor device configured to be worn on a body of a subject and which includes: (i) a motion sensor configured to detect motion of the subject, (ii) a position sensor configured to acquire a current position of the subject based on a GPS signal, and (iii) a condition determination sensor for detecting condition information related to a condition under which the subject performs the motion, the program being executable by the computer to control the computer to perform functions comprising:

generating time-series exercise data based on output from the wearable sensor device, wherein, in generating the time-series exercise data, the computer calculates a plurality of indicators based on at least acceleration data output from the motion sensor and position data output from the position sensor, the plurality of indicators including at least a first indicator expressing a first exercise metric and a second indicator which has a correlative relationship with the first indicator and which expresses a second exercise metric other than the first exercise metric;

generating a first period-specific model using the time-series exercise data from a first time period which is selected based on the condition information, wherein the first period-specific model is trained to express a relationship between the first indicator and the second indicator in the first time period using values of the first indicator in the time-series exercise data from the first time period as input and using values of the second indicator in the time-series exercise data from the first time period as output, and is structured to receive a value of the first indicator as an input and to generate a value of the second indicator as an output;

generating a second period-specific model using the time-series exercise data from a second time period other than the first time period and which is selected based on the condition information, wherein the second period-specific model is trained to express a relationship between the first indicator and the second indicator in the second time period using values of the first indicator in the time-series exercise data from the second time period as input and using values of the second indicator in the time-series exercise data from the second time period as output, and is structured to receive a value of the first indicator as an input and to generate a value of the second indicator as an output;

storing the generated first period-specific model and second period-specific model in a memory;

receiving, via a user interface, input of a value of the first indicator;

generating first estimation data by inputting the value of the first indicator received via the user interface into the stored first period-specific model, to obtain an estimated value of the second indicator that corresponds to the input value of the first indicator in the first time period as the first estimation data;

generating second estimation data by inputting the value of the first indicator received via the user interface into the stored second period-specific model, to obtain an estimated value of the second indicator that corresponds to the input value of the first indicator in the second time period as the second estimation data; and performing display control to display, on a display, the generated first estimation data and the generated second estimation data in a mutually comparable graphical format.

* * * * *